United States Patent
Kurashima et al.

(10) Patent No.: US 6,954,184 B2
(45) Date of Patent: Oct. 11, 2005

(54) ELECTRO-OPTICAL PANEL, ELECTRO-OPTICAL DEVICE, AND ELECTRONIC APPARATUS

(75) Inventors: Takeshi Kurashima, Matsumoto (JP); Kogo Endo, Chino (JP); Akira Sato, Matsumoto (JP); Takeyoshi Ushiki, Shiojiri (JP)

(73) Assignee: Seiko Epson Corporation (JP)

( * ) Notice: Subject to any disclaimer, the term of this patent is extended or adjusted under 35 U.S.C. 154(b) by 414 days.

(21) Appl. No.: 10/251,920

(22) Filed: Sep. 20, 2002

(65) Prior Publication Data

US 2003/0063041 A1 Apr. 3, 2003

(30) Foreign Application Priority Data

Sep. 21, 2001 (JP) ........................................ 2001-289008
Aug. 8, 2002 (JP) ........................................ 2002-231538

(51) Int. Cl.[7] ............................ G09G 5/00; G02F 1/1345
(52) U.S. Cl. .......................................... 345/1.3; 349/152
(58) Field of Search .......................... 345/1.3, 1.1, 94; 349/142, 150–152; 439/62

(56) References Cited

U.S. PATENT DOCUMENTS 5,436,744 A * 7/1995 Arledge et al. ............. 349/150
6,262,785 B1 * 7/2001 Kim ............................ 349/58
6,646,622 B1 * 11/2003 Kronenberg et al. ......... 345/1.1
6,697,039 B1 * 2/2004 Yamakawa et al. ........... 345/98
2001/0054986 A1 * 12/2001 Leman ....................... 345/1.1
2002/0021258 A1 * 2/2002 Koenig ....................... 345/1.1

FOREIGN PATENT DOCUMENTS

| JP | 2001-051251 | 2/2001 |
|----|-------------|--------|
| JP | 2001-067049 | 3/2001 |
| JP | 2001-188486 | 7/2001 |
| JP | 2001-215475 | 8/2001 |
| JP | 2001-242831 | 9/2001 |

OTHER PUBLICATIONS

Communication from Japanese Patent Office re: counterpart application.

* cited by examiner

*Primary Examiner*—Xiao Wu
*Assistant Examiner*—M. Fatahiyar
(74) *Attorney, Agent, or Firm*—Harness, Dickey & Pierce, P.L.C.

(57) ABSTRACT

A liquid crystal device 60A includes a main display 1A and a sub-display 2A. Signals are supplied from a drive circuit 7 to first electrodes 15a and second electrodes 15b included in the main display 1A and third electrodes 15c and fourth electrodes 15d included in the sub-display 2A. Some of the first electrodes 15a of the main display 1A are electrically connected to the third electrodes 15c of the sub-display 2A.

24 Claims, 13 Drawing Sheets

ELECTRO-OPTICAL PANEL, ELECTRO-OPTICAL DEVICE, AND ELECTRONIC APPARATUS

BACKGROUND OF THE INVENTION

1. Technical Field of the Invention

The present invention relates to an electro-optical panel which has a panel structure containing an electro-optical material, to an electro-optical device which has a structure including an electro-optical material, and to an electronic apparatus formed by using the electro-optical device.

2. Description of the Related Art

An electro-optical panel is a panel structure that can be made available on the market as a single unit. By mounting a wiring board such as an FPC (Flexible Printed Circuit) to the electro-optical panel, signals and a power supply voltage can be supplied from an external circuit to the electro-optical panel through the wiring board. By attaching an illuminator to the electro-optical panel, light can be supplied to the electro-optical panel.

In general, electro-optical panels are regarded as electro-optical components which have no accessory devices such as wiring boards and illuminators. However, if a panel structure having a wiring board and an illuminator mounted thereon is commercially supplied as a single unit, the overall panel including the wiring board and the illuminator can be regarded as one electro-optical panel.

Also, if an electro-optical panel including a plurality of panel structures, which are connected to one another by wiring boards, is made available on the market, the structure including the plurality of panel structures can be regarded as one electro-optical panel.

Electro-optical devices include all devices which include an electro-optical material and which can function as one of a plurality of components forming an electronic apparatus such as a cellular phone. Specifically, an electro-optical panel is an electro-optical device; an electro-optical panel with a wiring board connected thereto is an electro-optical device; and an electro-optical panel with an illuminator attached thereto is an electro-optical device.

An example in which a case for a cellular phone is regarded as an electronic apparatus will now be considered. Recently, flip cellular phones have become popular. In such a cellular phone, a first body with an operation function and a mouthpiece, and a second body with a display function and an earpiece are connected to each other by a hinge. The angle formed by the two bodies around the hinge can be changed.

In the cellular phone, when the two bodies are unfolded, information displayed on the display can be observed and the cellular phone can be used as a phone. By folding the two bodies, the cellular phone becomes compact so that the cellular phone can be easily carried when not being used.

Recently, so-called double-display cellular phones have drawn public attention. A double-display cellular phone includes a main display on which information can be observed while the cellular phone is unfolded and a sub-display for displaying a caller in order that the caller, mail reception, and the time can be determined while the cellular phone is folded.

In such a known double-display cellular phone, the main display and the sub-display display information are driven by different drive circuits.

When the main display and the sub-display are driven by separate drive circuits, as described above, there is a problem that the power consumption increases. In particular, it is desirable for a portable electronic apparatus such as a cellular phone to have low power consumption because there are demands for suppressing the capacity of the power supply and demands for increasing the operating time as much as possible.

In view of the foregoing problems, it is one object of the present invention to suppress the power consumption when a plurality of panels are driven.

SUMMARY OF THE INVENTION

In order to achieve the foregoing objects, an electro-optical panel according to the present invention includes a first panel; a second panel; and a drive circuit for driving the first panel and the second panel.

According to the electro-optical panel, at least part of a drive signal supplied to the first panel can be supplied to the second panel. In other words, the common drive signal can be supplied from the single drive circuit to the first panel and the second panel. It is thus unnecessary to provide separate drive circuits for driving the first panel and the second panel. As a result, the power consumption can be greatly reduced, the number of components can be reduced, and the cost can be reduced.

In the foregoing arrangement, the drive circuit may be mounted on the first panel. Accordingly, the drive circuit can be fixed at a given position. Also, the space occupied by the electro-optical panel including the drive circuit can be reduced.

In the electro-optical panel arranged as described above, the first panel may include a first substrate including a first electrode to which a signal is supplied from the drive circuit and a second substrate including a second electrode to which a signal is supplied from the drive circuit. The second panel may include a third substrate including a third electrode to which a signal is supplied from the drive circuit and a fourth substrate including a fourth electrode to which a signal is supplied from the drive circuit. Preferably, in this case, the first electrode and the third electrode are electrically connected to each other.

With this arrangement, the common drive signal can be supplied from the drive circuit to the first electrode and the third electrode.

In the electro-optical panel arranged as described above, liquid crystal may be held between the first substrate and the second substrate and between the third substrate and the fourth substrate. Accordingly, a liquid crystal panel can be formed as the electro-optical panel.

In the electro-optical panel arranged as described above, the signal may be supplied from the drive circuit to the third electrode via the first electrode. Accordingly, the common signal can be supplied from the drive circuit.

In the electro-optical panel arranged as described above, the first electrode and the third electrode may be electrically connected to each other via a flexible wiring board. In other words, the first panel and the second panel are connected to each other by the flexible wiring board. In this case, the positional relationship between the first panel and the second panel can be set to a desired relationship by folding the flexible wiring board or by shaping the flexible wiring board to an appropriate shape.

In the electro-optical panel arranged as described above, the first electrode and the third electrode may be substantially linear, and the first electrode and the third electrode may be disposed substantially parallel to each other.

Accordingly, the first electrode and the third electrode can be connected to each other by substantially the shortest distance. Thus, the drive signal to be supplied to both electrodes is prevented from being delayed.

In the electro-optical panel arranged as described above, the first panel may include a first wire electrically connecting the drive circuit to the first electrode; a second wire electrically connecting the drive circuit to the second electrode; a third wire electrically connecting the first electrode to the third electrode; and a fourth wire electrically connecting the drive circuit to the fourth electrode. Accordingly, the common drive signal can be supplied from the drive circuit by providing a wire connecting each electrode to the drive circuit.

In the electro-optical panel arranged as described above, the first wire, the second wire, the third wire, and the fourth wire may be disposed on the first substrate. By disposing each wire on one of the substrates, the drive circuit can be connected to each electrode on one of the substrates.

In the electro-optical panel arranged as described above, the drive circuit may include the functions of stopping a signal supply to the fourth electrode when the first panel is displaying; and stopping a signal supply to the second electrode when the second panel is displaying. Accordingly, the unused panel can be non-displaying, and the power consumption can be reduced.

An electro-optical device according to the present invention includes the electro-optical panel arranged as described above. Accordingly, the electro-optical device having a plurality of faces can be provided.

The electro-optical device arranged as described above may include a plurality of faces. In this case, the first panel and the second panel may be disposed on different faces among the plurality of faces. Accordingly, the first panel and the second panel display on different faces, and hence the first panel and the second panel can be used properly depending on the desired purpose.

An electronic apparatus according to the present invention includes the electro-optical device arranged as described above. According to the electronic apparatus, a multiple-display can be achieved using the first panel and the second panel. The power consumed by the electro-optical device portion can be suppressed, and hence the power consumed by the electronic apparatus can also be reduced.

In the electro-optical panel arranged as described above, the drive circuit may be mounted to one side of the first panel, and the second panel may be connected to the first panel at a side facing the one side. This case is shown in, for example, FIG. 5.

In the electro-optical panel arranged as described above, the drive circuit may be mounted to one side of the first panel, and the second panel may be connected to the first panel at a side adjacent to the one side. This case is shown in, for example, FIG. 13.

In the electro-optical panel arranged as described above, the drive circuit may be mounted to one side of the first panel, and the second panel may be connected to the first panel at the one side. This case is shown in, for example, FIGS. 10, 11, and 12.

In the electro-optical panel arranged as described above, the first electrode and the third electrode may be signal lines. According to this embodiment, the signal lines can be shared between the first panel and the second panel by connecting the first electrode to the third electrode.

In the electro-optical panel arranged as described above, the first panel may include a first substrate including a first electrode to which a signal is supplied from the drive circuit and a second substrate including a second electrode to which a signal is supplied from the drive circuit. The second panel may include a third substrate including a third electrode to which a signal is supplied from the drive circuit and a fourth substrate including a fourth electrode to which a signal is supplied from the drive circuit. In this case, the second electrode and the fourth electrode may be electrically connected to each other. The second electrode and the fourth electrode may be scanning lines. According to this embodiment, the scanning lines can be shared between the first panel and the second panel.

In the electro-optical panel arranged as described above, in addition to the fact that the first electrode and the third electrode are electrically connected to each other, the second electrode and the fourth electrode may be electrically connected to each other. According to this embodiment, the signal lines and the scanning lines can be shared between the first panel and the second panel.

In the electro-optical panel arranged as described above, the first panel may include a first substrate including a first electrode to which a signal is supplied from the drive circuit and a second substrate including a second electrode to which a signal is supplied from the drive circuit. The second panel may include a third substrate including a third electrode to which a signal is supplied from the drive circuit and a fourth substrate including a fourth electrode to which a signal is supplied from the drive circuit. In this case, each of the first electrode, the second electrode, the third electrode, and the fourth electrode may be independently and electrically connected to the drive circuit. According to this embodiment, the first electrode, the second electrode, the third electrode, and the fourth electrode are separately and independently driven.

DETAILED DESCRIPTION OF THE PREFERRED EMBODIMENTS

Electronic Apparatus

Figure 1:
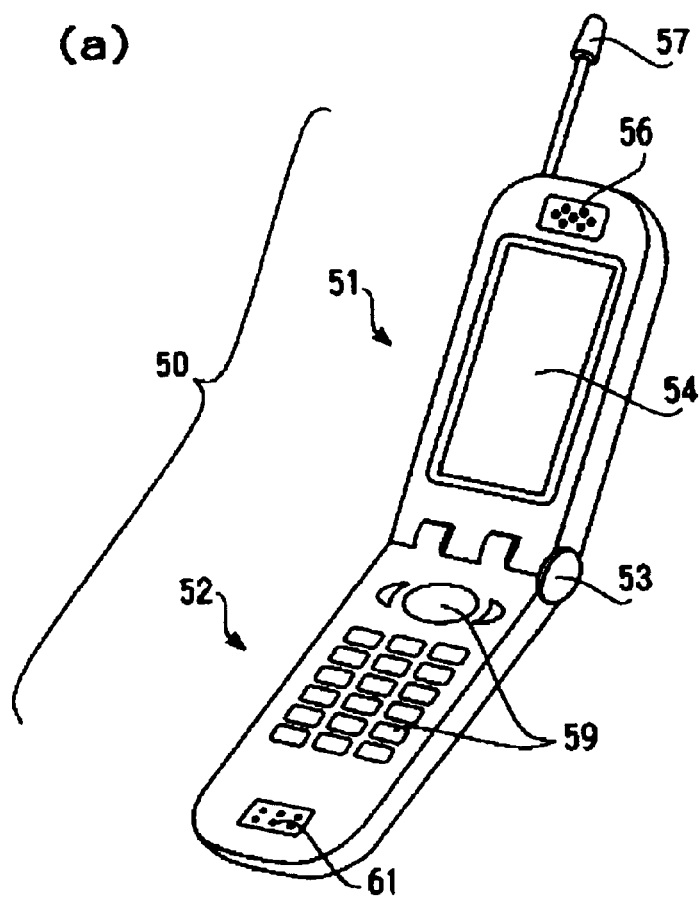
FIG. 1 illustrates an embodiment of a case in which the present invention is applied to a cellular phone, which is an example of an electronic apparatus, specifically, (a) illustrating the unfolded cellular phone and (b) illustrating the folded cellular phone.
Figure 1:
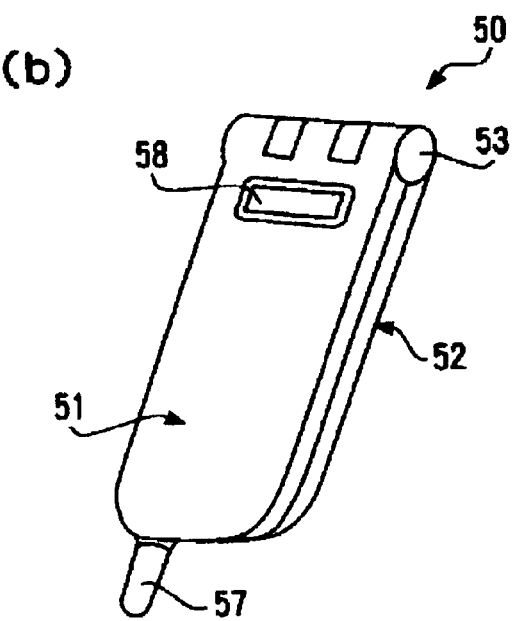
Figure 2:
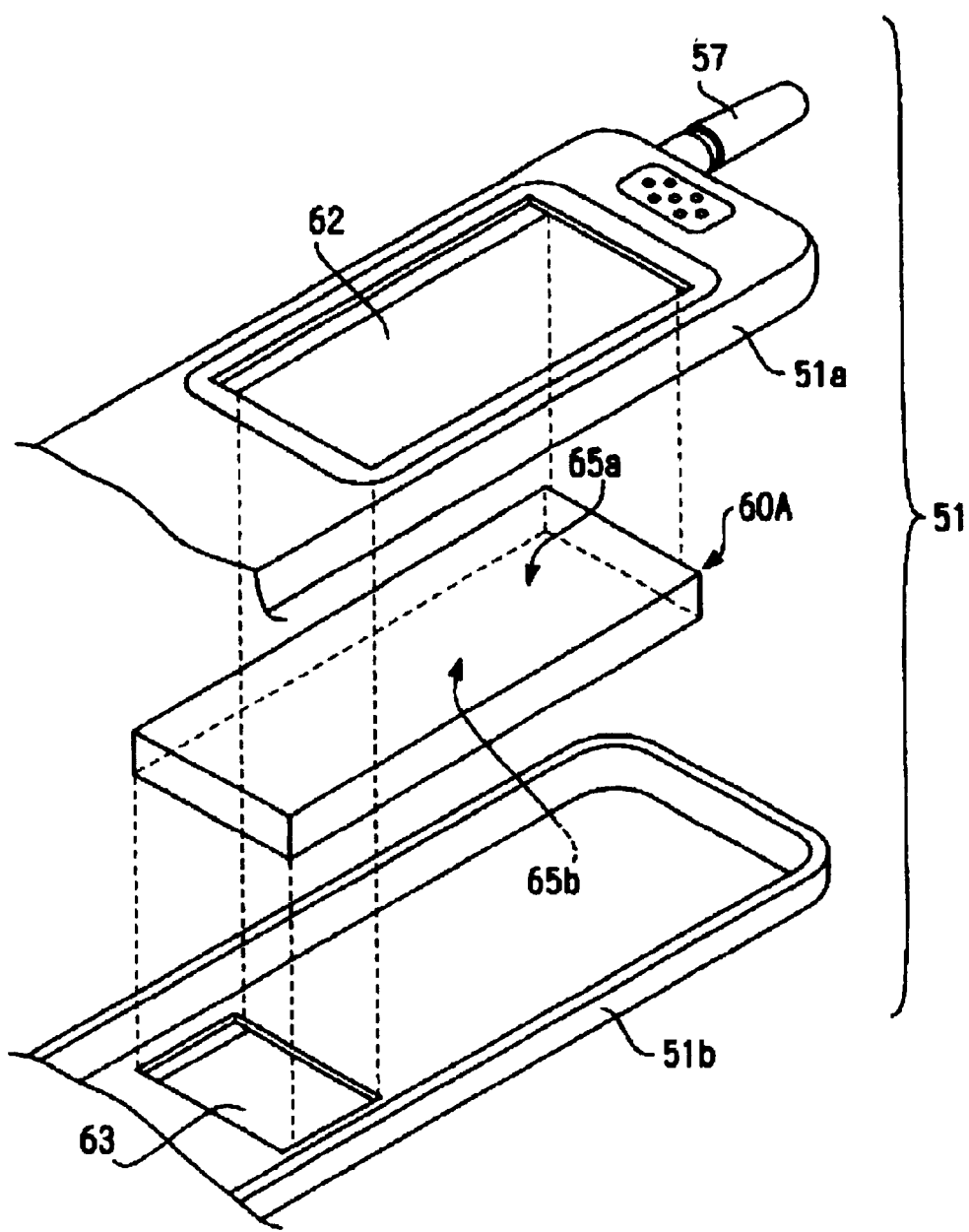
FIG. 2 is an exploded perspective view of the main portions of the cellular phone shown in FIG. 1.

Hereinafter an embodiment of an electronic apparatus according to the present invention will be described using a flip cellular phone as an example. FIG. 1 includes perspective views of the cellular phone. Specifically, FIG. 1(*a*) illustrates the unfolded cellular phone, and FIG. 1(*b*) illustrates the folded cellular phone. FIG. 2 is an exploded perspective view of part of a first body including a display of the cellular phone.

A cellular phone 50 includes a first body 51 and a second body 52. These bodies 51 and 52 are movably connected to each other by a hinge 53. The first body 51 includes an earpiece 56 and an antenna 57. The second body 52 includes a plurality of operation keys 59 and a mouthpiece 61. As shown in FIG. 1(*a*), a main display 54 is provided on the inner surface of the first body 51. As shown in FIG. 1(*b*), a sub-display 58 is provided on the outer surface of the first body 51.

The angle between the two bodies 51 and 52 around the hinge 53 can be changed. As shown in FIG. 1(*a*), when the first body 51 and the second body 52 are unfolded, information displayed on the main display 54 can be observed, and the cellular phone can be used as a phone.

When the cellular phone is not in use, as shown in FIG. 1(*b*), the first body 51 and the second body 52 can be folded into a compact form so that the cellular phone can be easily carried. With the cellular phone being folded, the sub-display 58 on the first body 51 allows a user to determine a caller, mail reception, and the time.

The first body 51 includes, as shown in FIG. 2, an upper case 51*a*, a lower case 51*b*, and a liquid crystal device 60A, serving as an electro-optical device, held between these cases 51*a* and 51*b*. Although the detailed configuration is not shown, the liquid crystal device 60A includes a first face 65*a* and a second face 65*b*, which are opposed to each other. On the first face 65*a*, a display surface of the main display 54 (see FIG. 1) is positioned. On the second face 65*b*, a display surface of the sub-display 58 (see FIG. 1) is positioned. The upper case 51*a* has a first aperture 62 through which the display surface of the main display 54 can be seen. In contrast, the lower case 51*b* has a second aperture 63 through which the display surface of the sub-display 58 can be seen.

Embodiments of Electro-optical Panel and Electro-optical Device

Using FIGS. 3 to 5, an embodiment of an electro-optical device according to the present invention will now be described using a liquid crystal device as an example, and an embodiment of an electro-optical panel according to the present invention will now be described using a liquid crystal panel as an example.

Figure 3:
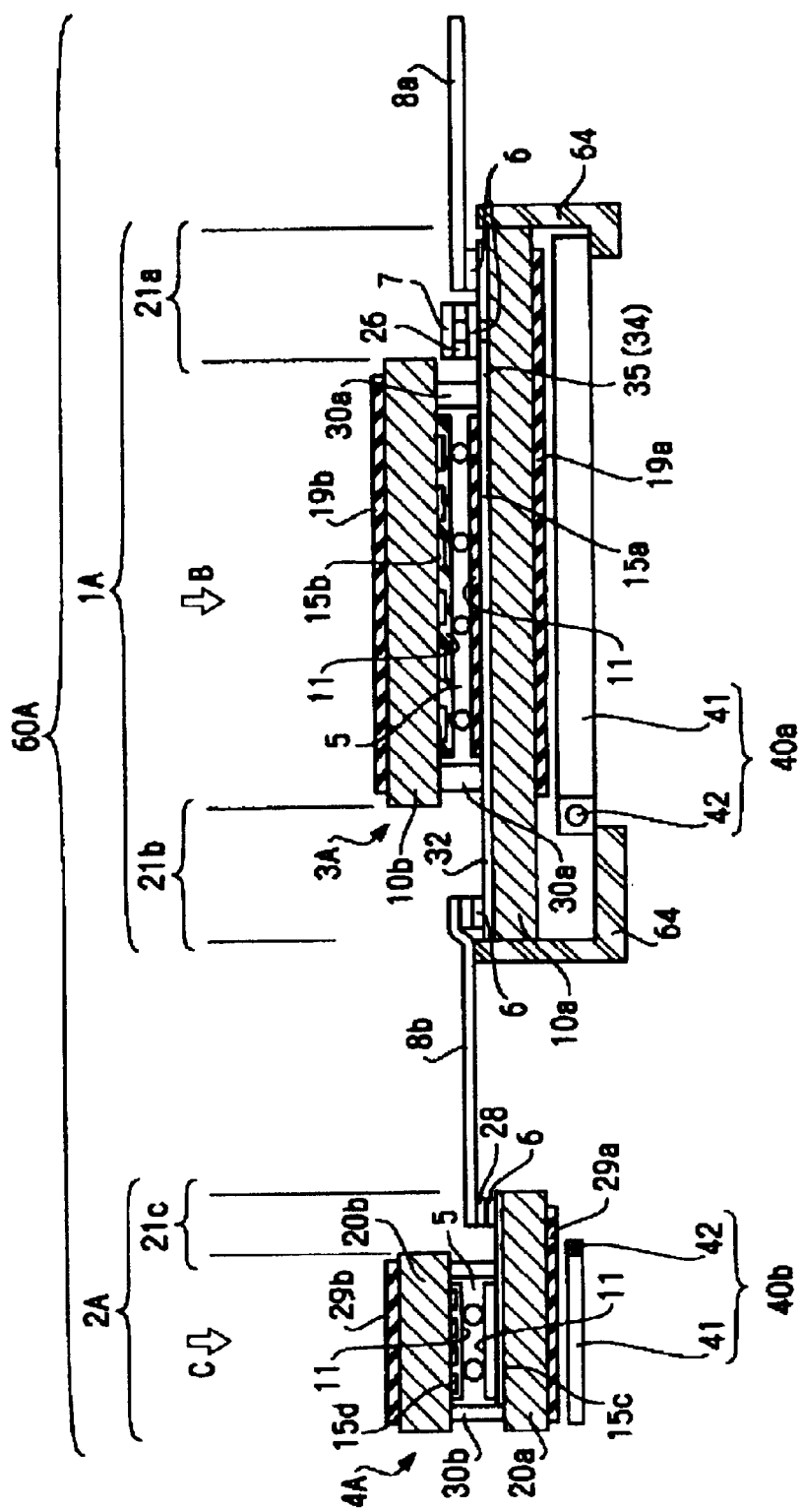
FIG. 3 is a sectional view showing an embodiment of a case in which the present invention is applied to a liquid crystal panel, which is an example of an electro-optical panel, and to a liquid crystal device, which is an example of an electro-optical device.

FIG. 3 shows the sectional configuration of the liquid crystal device 60A. FIG. 4 is a perspective view of the liquid crystal device 60A. FIG. 3 shows the liquid crystal device 60A, which is shown in FIG. 4, contained in a housing 64. FIG. 3 corresponds to a sectional view taken along the line A–A' of FIG. 4. FIG. 5 is a plan view for describing the positional relationships among electrodes and wires disposed in the liquid crystal panel forming the liquid crystal device 60A.

In FIG. 3, the liquid crystal device 60A includes a main display 1A, a sub-display 2A, and the housing 64 for containing these displays 1A and 2A. The main display 1A is a transmissive simple matrix liquid crystal device and includes a first panel 3A, which has panel structures containing a liquid crystal layer therebetween, a pair of polarizers 19*a* and 19*b* disposed so as to hold the first panel 3A therebetween, and an illuminator 40*a* for illuminating the first panel 3A with light.

The sub-display 2A is also a transmissive simple matrix liquid crystal device and includes a second panel 4A, which has panel structures containing a liquid crystal layer therebetween, a pair of polarizers 29*a* and 29*b* disposed so as to hold the second panel 4A therebetween, and an illuminator 40*b* for illuminating the second panel 4A with light. The main display 1A and the sub-display 2A are connected to each other by a flexible second wiring board 8*b*. A flexible first wiring board 8*a* is connected to the main display 1A. Signals and a power supply voltage are supplied from an external circuit to the liquid crystal device 60A through the first wiring board 8*a*.

Each of the illuminators 40*a* and 40*b* includes a light guide plate 41 and a light source 42. Although not shown in the drawing, if necessary, optical sheets such as prism sheets can be disposed between the light guide plate 41 of the illuminator 40*a* and the first panel 3A and between the light guide plate 41 of the illuminator 40*b* and the second panel 4A.

In this embodiment, the liquid crystal panel serving as the electro-optical panel includes the first panel 3A, the second panel 4A, and the second wiring board 8*b* for connecting the first panel 4A to the second panel 4A. The liquid crystal device 60A serving as the electro-optical device includes, on the above-described liquid crystal panel, the illuminators 40*a* and 40*b*, the polarizers 19*a*, 19*b*, 29*a*, and 29*b*, and the first wiring board 8*a*. The liquid crystal device 60A arranged as described above is contained in the housing 64.

The liquid crystal panel is regarded as a structure made available on the market as a single unit. When a product produced by mounting the polarizers 19*a*, 19*b*, 29*a*, and 29*b* on the first panel 3A and the second panel 4A can be regarded as a single unit, the structure including these polarizers is the liquid crystal panel.

When incorporating the liquid crystal device 60A into the cellular phone, the second wiring board 8*b* shown in FIG. 3 is folded so that the display surface of the first panel 3A and the display surface of the second panel 4A can be positioned on the opposing faces 65a and 65b of the liquid crystal device 60 shown in FIG. 2.

In FIG. 3, the main display 1A is formed by attaching and fixing a first substrate 10a and a second substrate 10b at a predetermined distance from each other using a sealing member 30a. The first substrate 10a and the second substrate 10b are formed of, for example, transparent glass, transparent quartz, or transparent plastic and have a rectangular shape when viewed from the direction indicated by the arrow B. The sealing member 30a has, as shown in FIG. 5, a gap portion, which is used as a liquid crystal inlet 31 through which liquid crystal is injected. After liquid crystal is injected, the liquid crystal inlet 31 is sealed by a sealant (not shown) formed of, for example, a UV curable resin.

In FIG. 3, between the first substrate 10a and the second substrate 10b, an area defined by the sealing member 30a, which is a liquid-crystal-filled area, is filled with STN (Super Twisted Nematic) liquid crystal 5, serving as an electro-optical material. On the first substrate 10a and the second substrate 10b, mutually orthogonal first electrodes 15a and second electrodes 15b for driving the liquid crystal are formed by, for example, transparent ITO (Indium Tin Oxide) films arranged in stripes when viewed from the direction indicated by the arrow B. Alignment films 11 are formed on the inner surfaces of the first substrate 10a and the second substrate 10b.

A drive signal for driving the liquid crystal forming each pixel is supplied to the electrodes 15a and 15b. In this embodiment, transmissive-type display is performed by transmitting light from the illuminators 40a and 40b through the first panel 3A and the second panel 4A. Alternatively, when reflection-type display or semi-transmissive-reflection type display is performed, one group of the electrodes 15a and 15b is formed of a reflective metal such as aluminum, and this group of electrodes can be used as a light reflection film.

Pixels are formed at the intersections of the first electrodes 15a and the second electrodes 15b. Since the liquid crystal device according to this embodiment is a simple matrix type, the first electrodes 15a function as image signal electrodes to which on-voltage or off-voltage image signals are supplied, and the second electrodes 15b function as scanning electrodes to which scanning signals are supplied. The polarizers 19a and 19b are attached to the exterior surfaces of the first substrate 10a and the second substrate 10b, respectively. If necessary, phase plates can be provided between the substrates 10a and 10b and the polarizers 19a and 19b. The phase plates remove coloring in the liquid crystal layer formed by the liquid crystal 5.

In FIG. 3, the sub-display 2A is formed by attaching and fixing the first substrate 20a and the second substrate 20b at a predetermined distance from each other using a sealing member 30b. The first substrate 20a and the second substrate 20b are formed of, for example, transparent glass, transparent quartz, or transparent plastic and have a rectangular shape when viewed from the direction indicated by the arrow C. The sealing member 30b has, as shown in FIG. 5, a gap portion, which is used as a liquid crystal inlet 31 through which liquid crystal is injected. After liquid crystal is injected, the liquid crystal inlet 31 is sealed by a sealant (not shown) formed of, for example, a UV curable resin.

Between the first substrate 20a and the second substrate 20b, an area defined by the sealing member 30b, which is a liquid-crystal-filled area, is filled with STN liquid crystal 5 serving as an electro-optical material. On the first substrate 20a and the second substrate 20b, mutually orthogonal third electrodes 15c and fourth electrodes 15d for driving the liquid crystal are formed by, for example, transparent ITO films arranged in stripes when viewed from the direction indicated by the arrow C. Alignment films 11 are formed on the inner surfaces of the first substrate 20a and the second substrate 20b.

A drive signal for driving the liquid crystal forming each pixel is supplied to the electrodes 15c and 15d. When reflection-type display or semi-transmissive-reflection type display is performed depending on the type of liquid crystal device, one group of the electrodes 15c and 15d is formed of a reflective metal such as aluminum, and this group of electrodes can be used as a light reflection film.

Pixels are formed at the intersections of the third electrodes 15c and the fourth electrodes 15d. Since the liquid crystal device according to this embodiment is a simple matrix type, the third electrodes 15c function as image signal electrodes to which on-voltage or off-voltage image signals are supplied, and the fourth electrodes 15d function as scanning electrodes to which scanning signals are supplied. The polarizers 29a and 29b are attached to the exterior surfaces of the first substrate 20a and the second substrate 20b, respectively. If necessary, phase plates can be provided between the substrates 20a and 20b and the polarizers 29a and 29b. The phase plates remove coloring in the liquid crystal layer formed by the liquid crystal 5.

Figure 5:
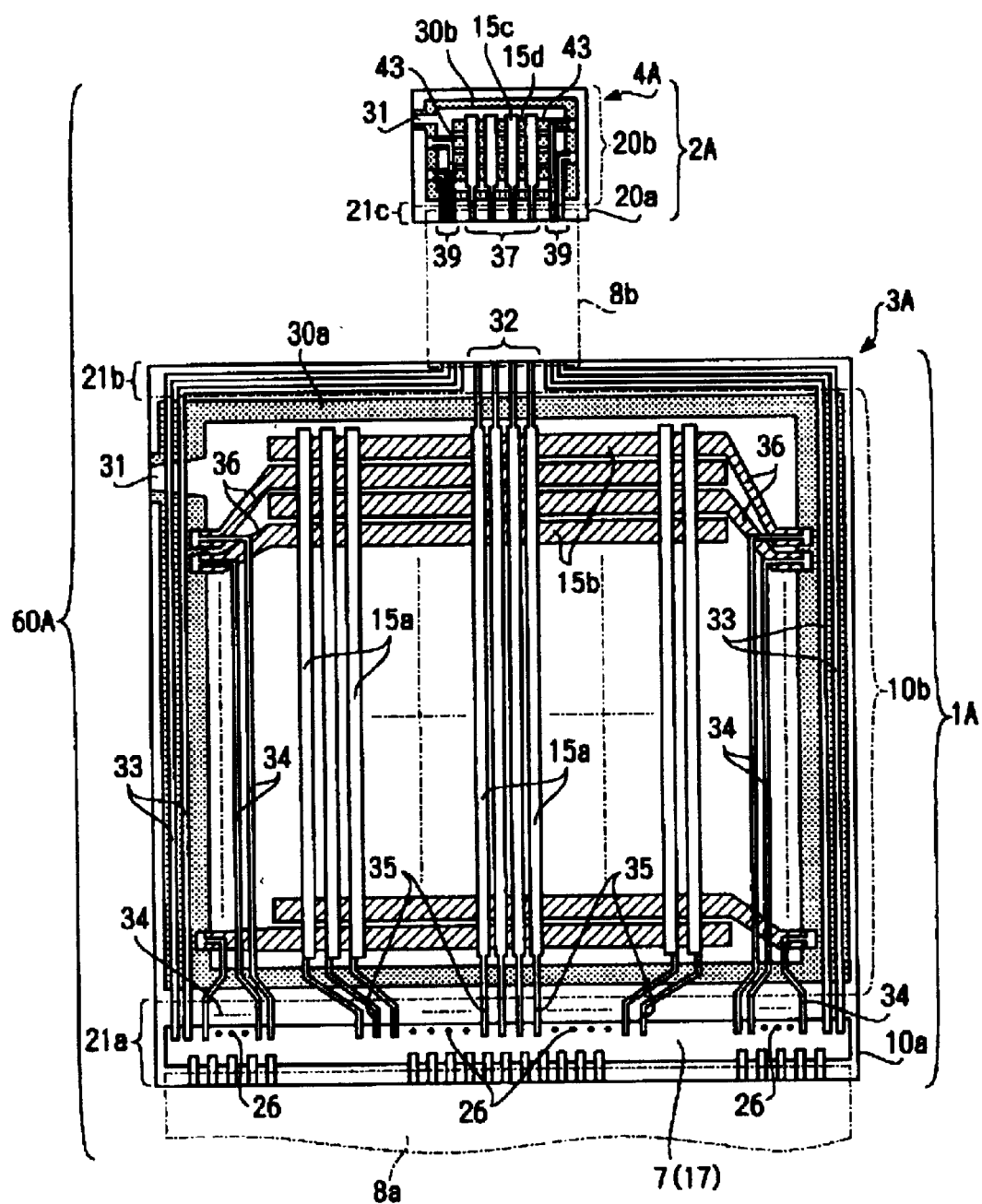
FIG. 5 is a plan sectional view showing the plan configuration of the interior of the liquid crystal device shown in FIG. 3.

In FIG. 5, the electrodes 15a, 15b, 15c, and 15d are schematically shown as being broader and disposed at intervals greater than the actual intervals in order to clearly show the configuration of the liquid crystal panel. Actually, however, these electrodes are narrower and are disposed at intervals less than those displayed.

In the main display 1A shown in FIG. 3, the first substrate 10a is formed to be larger than the second substrate 10b. The first substrate 10a has a first protrusion 21a and a second protrusion 21b, which protrude past two opposing sides of the second substrate 10b. In the sub-display 2A, the first substrate 20a is formed to be larger than the second substrate 20b. The first substrate 20a has a third protrusion 21c, which protrudes past the second substrate 20b.

Figure 4:
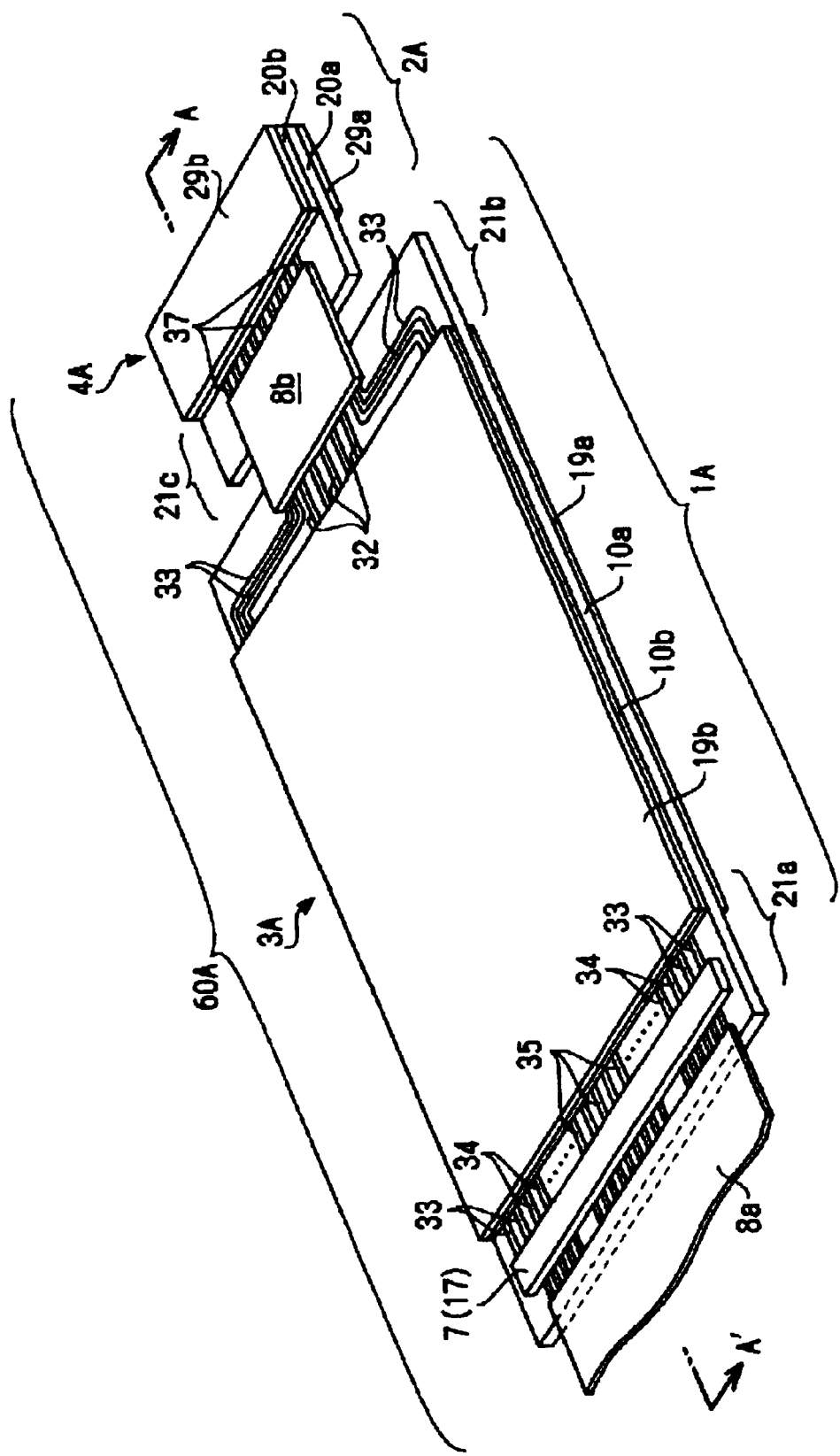
FIG. 4 is a perspective view of the liquid crystal device shown in FIG. 3.

On the first protrusion 21a, as shown in FIG. 4, a connection area to which the flexible first wiring board 8a is connected along one side of the second substrate 10b is formed. Inside the connection area, an IC mounting area 17 is provided parallel to the connection area. The IC mounting area 17 is an area for mounting a drive IC 7 serving as a drive circuit for outputting a drive signal to the electrodes 15a, 15b, 15c, and 15d, which are arranged in the main display 1A and the sub-display 2A (see FIG. 5).

The connection area for the first wiring board 8a is an area in which the first wiring board 8a for supplying various signals and a power supply voltage from the outside to the drive IC 7 is connected to the first substrate 10a. The drive IC 7 supplies a drive signal to each wire for driving each pixel of the liquid crystal device. The drive IC 7 is a bare chip and is mounted so that the active face thereof may oppose the substrate 10a using a COG (Chip On Glass) process. In FIG. 5, the drive IC 7 supplies image signals to the first electrodes 15a and the third electrodes 15c and scanning signals to the second electrodes 15b and the fourth electrodes 15d.

In contrast, in FIG. 4, in the second protrusion 21b, a connection area to which one side of the flexible second wiring board 8b is connected along one side of the first substrate 10a is provided. In the third protrusion 21c, a connection area to which the other side of the second wiring board 8b is connected along one side of the first substrate 20a is provided.

In FIG. 5, edges of the second electrodes 15b formed on the second substrate 10b in the main display 1A are electrically connected to edges of routed wires 36 disposed on the second substrate 10b. When the second substrate 10b and the first substrate 10a are attached to each other by the sealing member 30a, the other edges of the routed wires 36 are electrically connected to edges of routed wires 34, which extend from both ends of the IC mounting area 17 of the first substrate 10a, via conducting members included in the sealing member 30a.

Specifically, the routed wires 34 and 36 function as second wires for electrically connecting the second electrodes 15b to the drive IC 7. The drive IC 7 has output electrodes 26 on the active face thereof. The routed wires 34 are electrically connected to the output electrodes 26 via ACFs (Anisotropic Conductive Films) 6 (see FIG. 3).

Edges of the first electrodes 15a formed on the first substrate 10a are electrically connected to edges of first wires 35. The other edges of the first wires 35 are electrically connected to the output electrodes 26 of the drive IC 7 via the ACFs 6 (see FIG. 3). In contrast, the other edges of some of the second electrodes 15a (four electrodes in this embodiment) are electrically connected to edges of third wires 32 disposed on the second protrusion 21b. On the first substrate 10a, fourth wires 33 for electrically connecting the second wiring board 8b to the drive IC 7 are disposed along edges of the first substrate 10a. Edges of the fourth wires 33 are disposed at the second protrusion 21b.

The first substrate 20a of the sub-display 2A includes fifth wires 37, which are electrically connected to the third electrodes 15c, and routed wires 39, which are electrically connected to the fourth electrodes 15d. In contrast, the second substrate 20b facing the first substrate 20a includes routed wires 43, which are electrically connected to the fourth electrodes 15d. The routed wires 39 on the first substrate 20a and the routed wires 43 on the second substrate 20b are electrically connected to each other via conducting members included in the sealing member 30b. The routed wires 39 and the routed wires 43 form sixth wires for conductively connecting the fourth electrodes 15d to the second wiring board 8b. The routed wires 39, which are part of the sixth wires, and the fifth wires 37 are electrically connected to the electrodes 28 (see FIG. 3) provided on the second wiring board 8b via the ACFs 6 (see FIG. 3).

In FIG. 5, the third wires 32 in the main display 1A are electrically connected to the fifth wires 37 in the sub-display 2A via the electrodes provided on the second wiring board 8b. Since the fifth wires 37 are electrically connected to the third electrodes 15, image signals are supplied from the drive IC 7 to the third electrodes 15c via some of the first electrodes 15a in the main display 1A. In other words, the main display 1A and the sub-display 2A electrically share the wires to which an image signal is supplied from one drive IC 7.

The fourth wires 33 in the main display 1A are electrically connected to the routed wires 39 in the sub-display 2A via the electrodes provided on the second wiring board 8b. Specifically, the same drive IC 7 as the drive IC 7 for supplying signals to the main display 1A supplies scanning signals to the fourth electrodes 15d of the sub-display 2A. In other words, one drive IC 7 supplies corresponding scanning signals to the main display 1A and the sub-display 2A.

Accordingly, in this embodiment, the drive IC for driving the different displays 1A and 2A can be shared. Compared with a case in which individual drive ICs are provided for driving different displays, the power consumption can be greatly reduced.

The first electrodes 15a and the second electrodes 15b disposed on the main display 1A and the third electrodes 15c and the fourth electrodes 15d disposed on the sub-display 2A each have a linear shape. The first electrodes 15a disposed on the main display 1A and the third electrodes 15c disposed on the sub-display 2A are disposed substantially parallel to each other. The first electrodes 15a and the third electrodes 15c can be electrically connected to each other by substantially the shortest distance. Thus, an image signal to be supplied to both the first electrodes 15a and the third electrodes 15c is prevented from being delayed relative to the third electrodes 15c.

The sub-display 2A can be connected to the main display 1A by attaching the second wiring board 8b to a side orthogonal to one side of the main display 1A, to which the first wiring board 8a is attached, and by arranging the sub-display 2A to be positioned on a side orthogonal to one side to which the first wiring board 8a is attached. On the other hand, the wiring for connecting the first electrodes 15a to the third electrodes 15c becomes long, and thus signal transmission to the third electrodes 15c may be delayed.

In contrast, as in this embodiment, when the sub-display 2A is positioned on one side facing one side of the main display 1A, to which the first wiring board 8a is attached, such signal transmission delay can be prevented. Preferably, the first electrodes 15a and the third electrodes 15c are formed of conductive films with a low wiring resistance, such as conductive films including aluminum, e.g., an aluminum element or an aluminum alloy. Accordingly, signal delay can be further prevented.

In this embodiment, the drive circuit in the drive IC 7 can be arranged so that no scanning signal is supplied to the sub-display 2A when the main display 1A is displaying and no scanning signal is supplied to the main display 1 when the sub-display 2A is displaying. Accordingly, the power consumption can be reduced.

Modification

In the above-described embodiments, transmissive-type liquid crystal panel structures are used for both the main display 1A and the sub-display 2A. Alternatively, semi-transmissive reflection-type liquid crystal panels or reflection-type liquid crystal panels can be used.

In the above-described embodiments, simple matrix liquid crystal panels are used for both the main display 1A and the sub-display 2A. Alternatively, active matrix liquid crystal panels using two-terminal switching devices, such as TFTs (Thin Film Transistors) or three-terminal switching devices, such as TFDs (Thin Film Diodes), can be used.

Another Embodiment of Electro-optical Panel and Electro-optical Device

An embodiment in a case in which the present invention is applied to an active-matrix electro-optical panel using TFD devices and to an electro-optical device using the electro-optical panel will now be described. In this embodiment, the electrode configuration and the drive circuit configuration mainly differ from those in the above-described embodiments where the simple matrix liquid crystal panel is used in the display, and the remaining configuration is substantially the same. Thus, the electrode configuration and the circuit configuration will be mainly described using FIG. 6.

Figure 6:
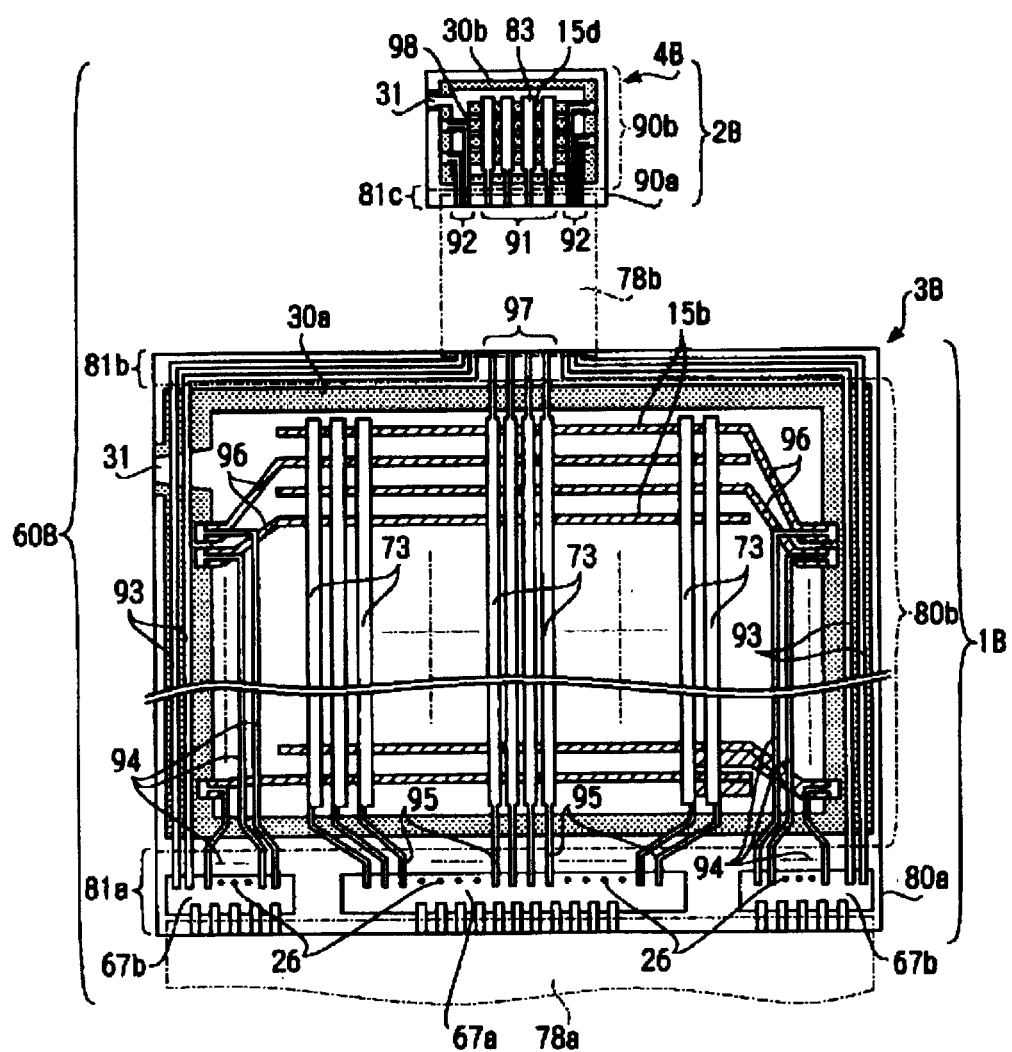
FIG. 6 is a plan sectional view showing another embodiment of a case in which the present invention is applied to a liquid crystal panel, which is an example of an electro-optical panel, and to a liquid crystal device, which is an example of an electro-optical device.

FIG. 6 is a plan view for describing the positional relationships among electrodes and wires disposed in a liquid crystal device 60B according to this embodiment. In FIG. 6, the liquid crystal device 60B includes a main display 1B and a sub-display 2B. The main display 1B and the sub-display 2B are transmissive active matrix liquid crystal panels. The fact that illuminators and polarizers are mounted on these panels is the same as the foregoing embodiments shown in FIGS. 3 to 5.

In this embodiment, a liquid crystal panel serving as an electro-optical panel includes a first panel 3B, which has panel structures forming part of the main display 1B and containing a liquid crystal layer therebetween, a second panel 4B, which has panel structures forming part of the sub-display 2B and containing a liquid crystal layer therebetween, and a flexible second wiring board 78b adhesively connected to both the first panel 3B and the second panel 4B. A flexible first wiring board 78a is adhesively connected to the first panel 3B.

The main display 1B is formed by attaching and fixing a first substrate 80a and a second substrate 80b at a predetermined distance from each other using a sealing member 30a. The first substrate 80a and the second substrate 80b are formed of, for example, transparent glass, transparent quartz, or transparent plastic and have a rectangular shape. The sealing member 30a has a gap portion, which is used as a liquid crystal inlet 31 through which liquid crystal is injected. After liquid crystal is injected, the liquid crystal inlet 31 is sealed by a sealant (not shown) formed of, for example, a UV curable resin.

Between the first substrate 80a and the second substrate 80b facing the first substrate, an area defined by the sealing member 30a, which is a liquid-crystal-filled area, is filled with 90-degree-twisted TN (Twisted Nematic) liquid crystal (not shown), serving as an electro-optical material. Linear line wires 73 are formed on the first substrate 80a. Linear second electrodes 15b, which are orthogonal to the line wires 73, are formed on the second substrate 80b facing the first substrate 80b. In this embodiment, data signals are supplied to the line wires 73, and scanning signals are supplied to the second electrodes 15b.

Figure 8:
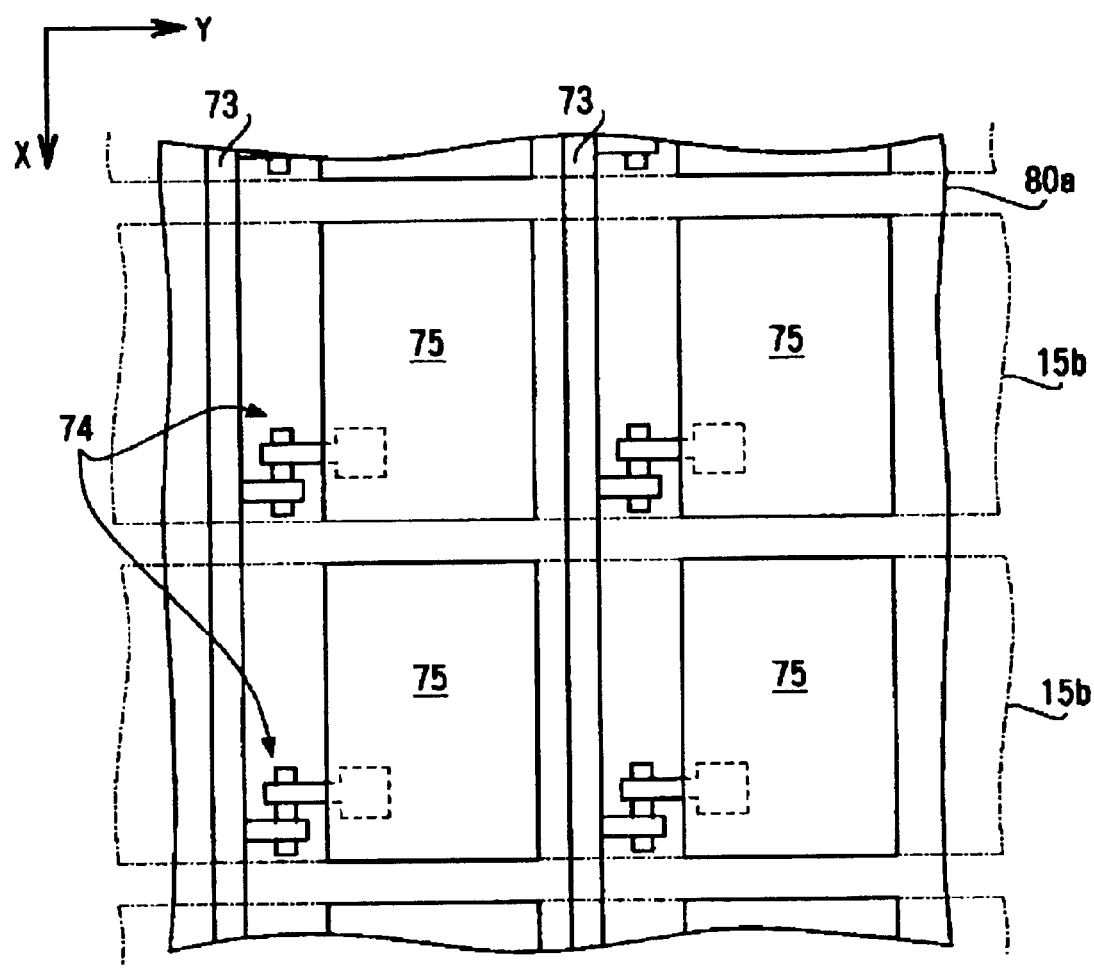
FIG. 8 is a plan view showing an example of switching devices which can be used in an electro-optical panel according to the present invention.

Although not shown in FIG. 6, as shown in FIG. 8, TFD devices 74 electrically connecting to the line wires 73 and pixel electrodes 75 electrically connecting to the line wires 73 through the TFD devices 74 are formed on the first substrate 80a. The pixel electrodes 75 are dot-shaped and formed of transparent conductive films, such as ITO.

The plurality of pixel electrodes 75 are disposed in lines along the direction in which one line wire 73 extends, that is, the X direction. Furthermore, the pixel electrodes 75 in line are disposed parallel to one another in the direction orthogonal to the line wire 73, that is, the Y direction. As a result, the plurality of pixel electrodes 75 are aligned in the form of a matrix in a plane defined by the X direction and the Y direction.

Each of the pixel electrodes 75 each form a display dot. By aligning these display dots in the form of a matrix, a display area for displaying images is formed. When using a color filter having color cells in the three primary colors, such as R (red), G (green), and B (blue), or C (cyan), M (magenta), and Y (yellow), one pixel is formed by three display dots corresponding to color cells in the three primary colors. When monochrome display is performed without using a color filter, one display dot forms one pixel.

In FIG. 6, the sub-display 2B is formed by attaching and fixing a first substrate 90a and a second substrate 90b facing the first substrate 90a at a predetermined distance from each other using a sealing member 30b. The first substrate 90a and the second substrate 90b facing the first substrate 90a are formed of, for example, transparent glass, transparent quartz, or transparent plastic and have a rectangular shape.

The sealing member 30b has a gap portion, which is used as a liquid crystal inlet 31 through which liquid crystal is injected. After liquid crystal is injected, the liquid crystal inlet 31 is sealed by a sealant (not shown) formed of, for example, a UV curable resin. Between the first substrate 90a and the second substrate 90b facing the first substrate 90a, an area defined by the sealing member 30b, which is a liquid-crystal-filled area, is filled with 90-degree-twisted TN liquid crystal (not shown), serving as an electro-optical material.

Linear line wires 83 are formed on the first substrate 90a. Linear fourth electrodes 15d, which are orthogonal to the line wires 83, are formed on the second substrate 80b facing the fist substrate 90a. In this embodiment, data signals are supplied to the line wires 83, and scanning signals are supplied to the fourth electrodes 15d.

TFD devices (not shown) electrically connecting to the line wires 83 and pixel electrodes (not shown) electrically connecting to the line wires 83 through the TFD devices are formed on the first substrate 90a. The pixel electrodes are formed of transparent conductive films, such as ITO. One pixel is formed by the intersection of the pixel electrode and the fourth electrode 15d. The TFD devices and the pixel electrodes included in the sub-display 2B are arranged similarly to the TFD devices 74 and the pixel electrodes 76 included in the main display 1B.

Figure 9:
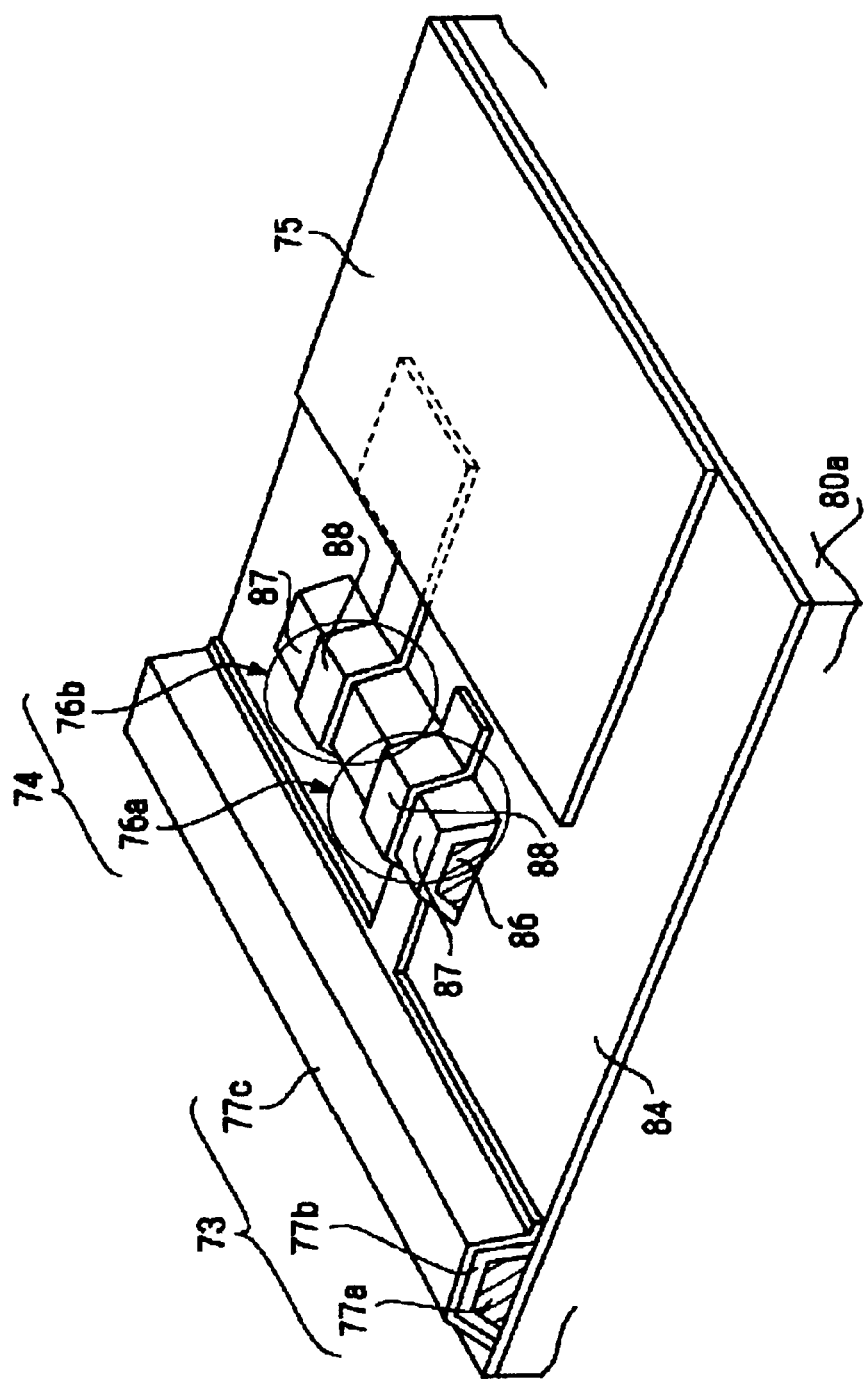
FIG. 9 is a perspective view showing one switching device shown in FIG. 8.

Each of the TFD devices 74 is formed, as shown in FIG. 9, by connecting a first TFD element 76a and a second TFD element 76B in series with each other. For example, the TFD device 74 can be formed as follows. Specifically, a first layer 77a of the line wire 73 and first metals 86 of the TFD device 74 are formed of TaW (tantalum tungsten). Then a second layer 77b of the line wire 73 and insulating films 87 of the TFD device 74 are formed by anodizing. Subsequently a third layer 77c of the line wire 73 and second metals 88 of the TFD device 74 are formed of, for example, Cr (chromium).

The second metal 88 of the first TFD element 76a extends from the third layer 77c of the line wire 73. The pixel electrode 75 is formed so as to overlap the leading edge of the second metal 88 of the second TFD element 76b. Taking into consideration that an electrical signal flows from the line wire 73 to the pixel electrode 75, in the first TFD element 76a, the electrical signal flows in the order of the second metal 88→the insulating films 87→the first metal 86 in accordance with the direction of the electric current. In contrast, in the second TFD element 76b, the electrical signal flows in the order of the first metal 86→the insulating film 87→the second metal 88.

In other words, the first TFD element 76a and the second TFD element 76b form a pair of TFD elements which are electrically in opposite directions and which are connected in series with each other. This configuration is generally referred to as the back-to-back configuration. It is known that a back-to-back TFD device can have stable characteristics compared with a case in which a TFD device is formed by one TFD element. In the drawing, reference numeral 84 denotes a base film, which is provided if necessary.

In the main display 1B shown in FIG. 6, the first substrate 80a is formed to be larger than the second substrate 80b facing the first substrate. The first substrate 80a has a first protrusion 81a and a second protrusion 81b, which protrude past two opposing sides of the second substrate 80b. In the sub-display 2A, the first substrate 90a is formed to be larger than the second display 90b facing the first substrate 90a. The first substrate 90a has a third protrusion 81c, which protrudes past the second substrate 90b.

On the first protrusion 81a, a connection area to which the flexible first wiring board 78a is connected along one side of the second substrate 80b is formed. Inside the connection area, an IC mounting area is provided parallel to the connection area. The IC mounting area is an area for mounting drive ICs serving as semiconductor devices for outputting drive signals to the line wires 73 and 83, the second electrodes 15b, and the fourth electrodes 15d, which are disposed in the main display 1B and the sub-display 2B.

In this embodiment, serving as drive ICs, a data-line drive IC 67a and scanning-line drive ICs 67b are provided. The scanning-line drive ICs 67b are provided at both sides of the IC mounting area (one for each side), while the data-line drive IC 67a is provided therebetween. The data-line drive IC 67a supplies image signals to the line wires 73 of the main display 1B and to the line wires 83 of the sub-display 2B. The scanning-line drive ICs 67b supply scanning signals to the second electrodes 15b of the main display 1B and to the fourth electrodes 15d of the sub-display 2B.

The connection area for the first wiring board 78a, which is provided on the first protrusion 81a of the first substrate 80a of the main display 1B, is an area for connecting the flexible first wiring board 78a to the first substrate 80a. The first wiring board 78a connected in this manner supplies various signals and a power supply voltage from the outside to the drive ICs 67a and 67b. The drive ICs 67a and 67b are bare chips and mounted on the first substrate 80a so that active faces thereof oppose the first substrate 80a. This mounting method is the so-called COG (Chip On Glass) mounting method.

In contrast, a connection area to which the flexible second wiring board 78b is connected along one side of the first substrate 80a is provided on the second protrusion 81b of the first substrate 80a. Also, a connection area to which the second wiring board 78b is connected along one side of the first substrate 90a is provided on the protrusion 81c of the first substrate 90a of the sub-display 2B.

The second electrodes 15b formed on the second substrate 80b facing the first substrate 80a of the main display 1B are electrically connected to edges of routed wires 96 disposed on the second substrate 80b. The other edges of the routed wires 96 are connected to edges of routed wires 94 via conducting members included in the sealing member 30a when the first substrate 80a and the second substrate 80b facing the first substrate 80a are attached to each other using the sealing member 30a.

The routed wires 94 extend from both ends of areas of the first substrate 80a in which the scanning-line drive ICs 67b are mounted. The routed wires 94 are electrically connected to output electrodes 26 formed on the scanning-line drive ICs 67b via ACFs (Anisotropic Conductive Films). As can be seen from the above description, the routed wires 94 and 96 function as second wires for electrically connecting the second electrodes 15b to the scanning-line drive ICs 67b.

Edges of the line wires 73 formed on the first substrate 80a of the main display 1B are electrically connected to edges of first wires 95. The other edges of the first wires 95 are electrically connected to output electrodes 26 provided on the data-line drive IC 67a via ACFs. In contrast, the other edges of some of the line wires 73 (four wires in this embodiment) are electrically connected to third wires 97 disposed on the second protrusion 81b. On the first substrate 80a, fourth wires 93 for electrically connecting the flexible second wiring board 78b to the drive ICs 67b are disposed along edges of the first substrate 80a. Edges of the fourth wires 93 are disposed at the second protrusion 81b.

The first substrate 90a of the sub-display 2B includes fifth wires 91, which are electrically connected to the line wires 83, and routed wires 92. The second substrate 90b facing the first substrate 90a includes routed wires 98, which are electrically connected to the fourth electrodes 15d. The routed wires 92 on the first substrate 90a and the routed wires 98 on the second substrate 90b are electrically connected to each other via conducting members included in the sealing member 30b. These routed wires 92 and 98 function as sixth wires for electrically connecting the fourth electrodes 15d to the drive ICs 67b. The fifth wires 91 and the routed wires 92, which are part of the sixth wires, are electrically connected to the electrodes provided on the second wiring board 78b via the ACFs 6 (see FIG. 3).

The third wires 97 formed in the main display 1B are electrically connected to the fifth wires 91 in the sub-display 2B via the electrodes provided on the second wiring board 78b. Since the fifth wires 91 are electrically connected to the line wires 83, an image signal is supplied from the data-line drive IC 67a to the line wires 83 via some of the line wires 73 in the main display 1B. In other words, the main display 1B and the sub-display 2B share the wires to which an image signal is supplied from one data-line drive IC 67a.

The fourth wires 93 in the main display 1B are electrically connected to the routed wires 92 via the electrodes provided on the second wiring board 78b. Specifically, scanning signals are supplied to the fourth electrodes 15d of the sub-display 2B from the same drive IC as the scanning-line drive IC 67b for supplying signals to the main display 1B. In other words, one scanning-line drive IC 67b supplies corresponding scanning signals to the main display 1B and the sub-display 2B.

Accordingly, in this embodiment, the drive ICs for driving the different displays can be shared. Compared with a case in which individual drive ICs are provided for driving different displays, the power consumption can be greatly reduced.

In this embodiment, the drive circuits can be designed not to supply scanning signals to the sub-display 2B when the main display 1B is displaying and not to supply scanning signals to the main display 1B when the sub-display 2B is displaying. Accordingly, the power consumption can be further reduced.

As described above, the present invention is applicable not only to simple matrix liquid crystal devices but also to active matrix liquid crystal devices.

Modification

In the foregoing embodiments, the second electrodes 15b provided in the main displays 1A and 1B and the fourth electrodes 15d provided in the sub-displays 2A and 2B are arranged in the form of a comb. In contrast, the second electrodes 15b and the fourth electrodes 15d can be disposed as in a liquid crystal device 60C shown in FIG. 7.

In the liquid crystal device 60C, panel screens of a main display 1C and a sub-display 2C are separated into upper portions and lower portions, as shown in the drawing. In areas corresponding to the upper portions of the panel screens, the second electrodes 15b and the fourth electrodes 15d extend from the left side of the panels toward the display areas. In contrast, in areas corresponding to the lower portions of the panel screens, the second electrodes 15b and the fourth electrodes 15d extend from the right side of the panels toward the display areas.

Figure 7:
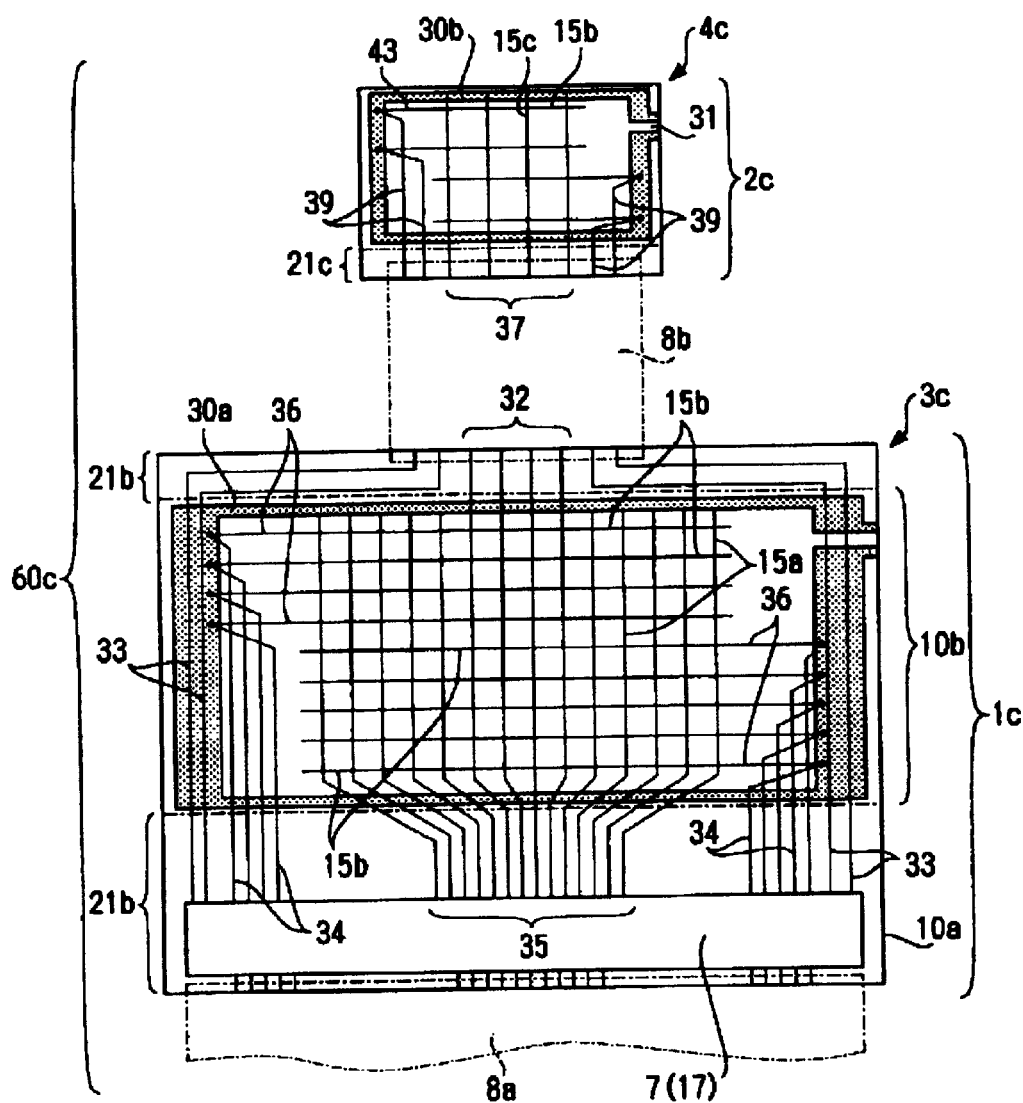
FIG. 7 is a plan sectional view showing yet another embodiment of a case in which the present invention is applied to a liquid crystal panel, which is an example of an electro-optical panel, and to a liquid crystal device, which is an example of an electro-optical device.

In the embodiment shown in FIG. 7, the present invention is applied to a simple matrix liquid crystal device. Only the arrangement of the second electrodes 15b and the fourth electrodes 15d differs from that of the simple matrix liquid crystal device shown in FIG. 5. In the embodiment shown in FIG. 7, the same reference numerals are given to the same components as those in the embodiment shown in FIG. 5.

In the foregoing embodiments, the wires to which an image signal is supplied are electrically shared by electrically connecting some of the wires on the main display to which the image signal is supplied and the wires on the sub-display to which the image signal is supplied with each other. There are various other possible manners in which the wires are shared. For example, the wires to which a scanning signal is supplied can be electrically shared by electrically connecting some of the wires on the main display to which the scanning signal is supplied to the wires on the sub-display to which the scanning signal is supplied.

In the foregoing embodiments, the main displays 1A, 1B, and 1C, and the sub-displays 2A, 2B, and 2C are described using monochrome displays as examples. However, the present invention is applicable to a liquid crystal device in which one or both displays perform color display.

In the foregoing embodiments, a transmissive-type liquid crystal device is used as an example. However, the present invention is applicable to semi-transmissive-reflection type liquid crystal devices and reflection-type liquid crystal devices.

In the liquid crystal device 60A shown in FIGS. 3 to 5, it is regarded that the main display 1A and the sub-display 2A are located on opposing faces while being incorporated in the electronic apparatus. However, various other positional relationships between the main display and the sub-display are possible. For example, the main display and the sub-display can be located on the same face. Alternatively, the configuration can be such that the sub-display is located on the side when viewed from a face on which the main display is located.

Although a case in which a liquid crystal device is provided with two displays has been illustrated in the foregoing embodiments, a liquid crystal display can be provided with three or more displays.

Although the cellular phone is used as an example of the electronic apparatus in the foregoing embodiments, the present invention is applicable to any type of electronic apparatus having a plurality of displays.

Another Embodiment of Electro-optical Panel and Electro-optical Device

Figure 10:
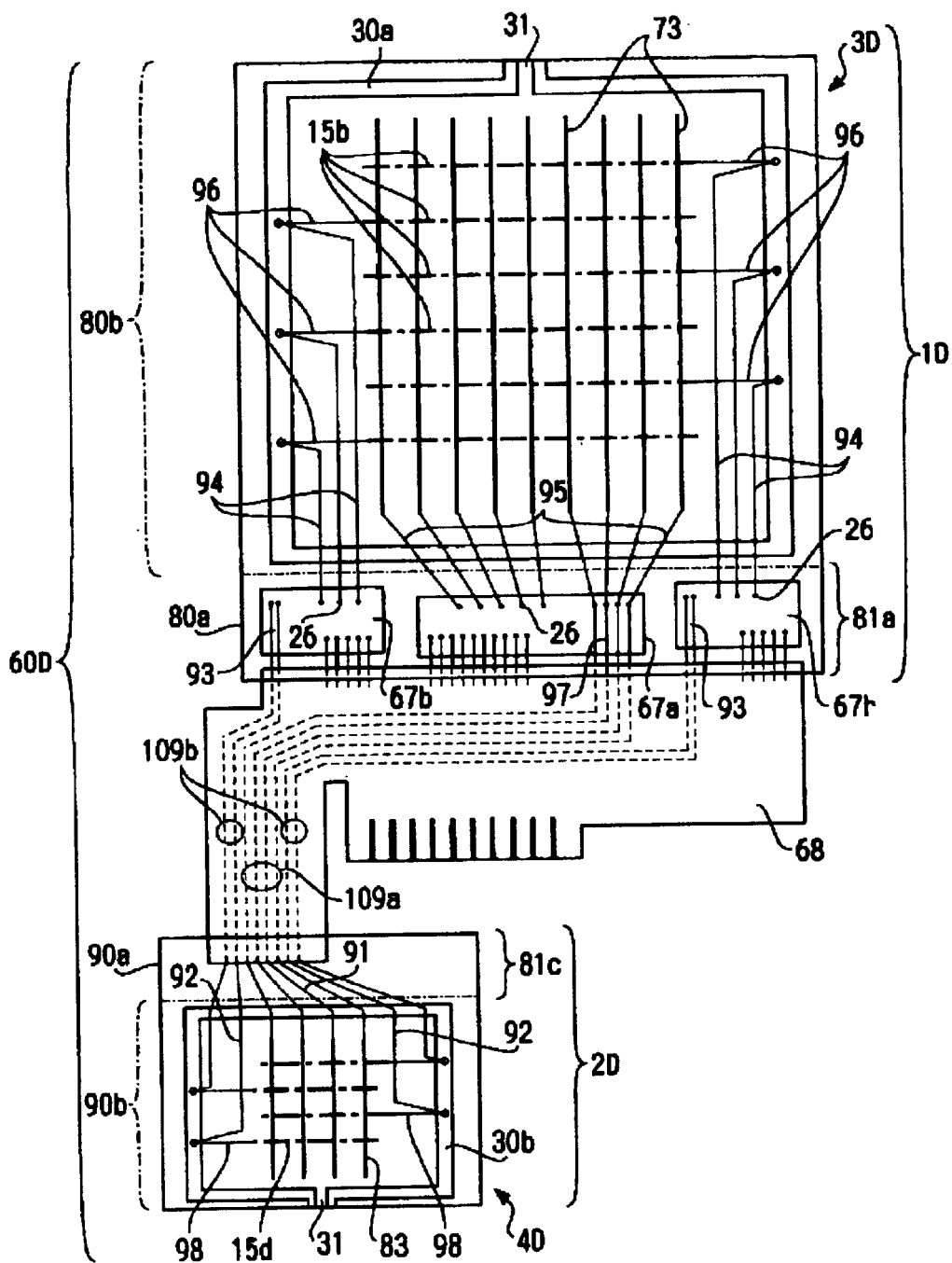
FIG. 10 is a plan sectional view showing another embodiment of a case in which the present invention is applied to a liquid crystal panel, which is an example of an electro-optical panel, and to a liquid crystal device, which is an example of an electro-optical device.

FIG. 10 shows the plan configuration of another embodiment of an electro-optical panel and an electro-optical device according to the present invention. The electro-optical panel shown here is a liquid crystal panel, and the electro-optical device is a liquid crystal device. The liquid crystal panel is in an active matrix mode in which switching devices such as TFD devices are used. Also, the liquid crystal panel is in a transmissive mode in which an illuminator is used as a backlight unit. These modes are the same as those in the liquid crystal panel used in the liquid crystal device 60B according to the foregoing embodiment shown in FIG. 6.

In the electro-optical panel and the electro-optical device shown in FIG. 10, the same reference numerals are used to indicate the same components as those of the electro-optical panel and the electro-optical device shown in FIG. 6, and descriptions thereof are omitted.

In FIG. 10, the liquid crystal panel is formed by connecting a first panel 3D, which is a main panel structure forming a main display 1D, and a second panel 4D, which is a main panel structure forming a sub-display 2D, with each other using a second wiring board 68. A liquid crystal device 60D is formed by mounting polarizers, an illuminator, and other necessary additional elements on the liquid crystal panel.

In the liquid crystal device 60B shown in FIG. 6, the first wiring board 78a for leading signals from an external circuit to the liquid crystal device 60B and the second wiring board 78b for connecting the main display 1B to the sub-display 2B are provided separately. In the liquid crystal device 60D shown in FIG. 10, the second wiring board 68 also has a function of leading signals from an external circuit to the liquid crystal device 60D.

Similar to the liquid crystal device 60B shown in FIG. 6, also in the liquid crystal device 60D shown in FIG. 10, line wires 73 functioning as signal lines in the main display 1D are connected to output electrodes 26 of a data-line drive IC 67a via first wires 95. Second electrodes 15b functioning as scanning lines are connected to output electrodes 26 of scanning-line drive ICs 67b via second wires formed by routed wires 96 and routed wires 94.

Line wires 83 functioning as signal lines in the sub-display 2D are connected to the output electrodes 26 of the data-line drive IC 67a via fifth wires 91 formed on a first substrate 90a of the sub-display 2D, wires 109a formed on the second wiring board 68, and third wires 97 formed on a first substrate 80a of the main display ID.

Fourth electrodes 15d functioning as scanning lines in the sub-display 2D are connected to the output electrodes 26 of the scanning-line drive ICs 67b via sixth wires formed by routed wires 98 formed on a second substrate 90b and routed wires 92 formed on the first substrate 90a, wires 109b formed on the second wiring board 68, and fourth wires 93 formed on the first substrate 80a of the main display 1D.

In this embodiment, the line wires (i.e., signal lines) 73 of the main display ID and the line wires (i.e., signal lines) 83 of the sub-display 2D are connected to the same output electrodes 26 of the data-line drive IC 67a. Thus, the signal lines are shared.

In the liquid crystal device 60B shown in FIG. 6, the second panel 4B in the sub-display 2B is connected to the first panel 3B in the main display 1B by the second wiring board 78b on the side (that is, the side corresponding to the second protrusion 81b) opposing the side (that is, the side corresponding to the first protrusion 81a) on which the drive circuits, namely, the drive ICs 67a and 67b, are mounted in the main display 1B.

In contrast, in this embodiment shown in FIG. 10, the second panel 4D in the sub-display 2D is connected to the first panel 3D in the main display 1D by the second wiring board 68 on the side (that is, the side corresponding to a first protrusion 81a) on which the drive circuits, namely, the drive ICs 67a and 67b, are mounted in the main display 1D.

In other words, in the case of the embodiment shown in FIG. 6, the display area of the main display 1B and the sub-display 2B are disposed on the same side with respect to the drive ICs 67a and 67b. In contrast, in this embodiment shown in FIG. 10, the display area of the main display 1D and the sub-display 2D are disposed on opposite sides with respect to the drive ICs 67a and 67b therebetween.

Another Embodiment of Electro-optical Panel and Electro-optical Device

Figure 11:
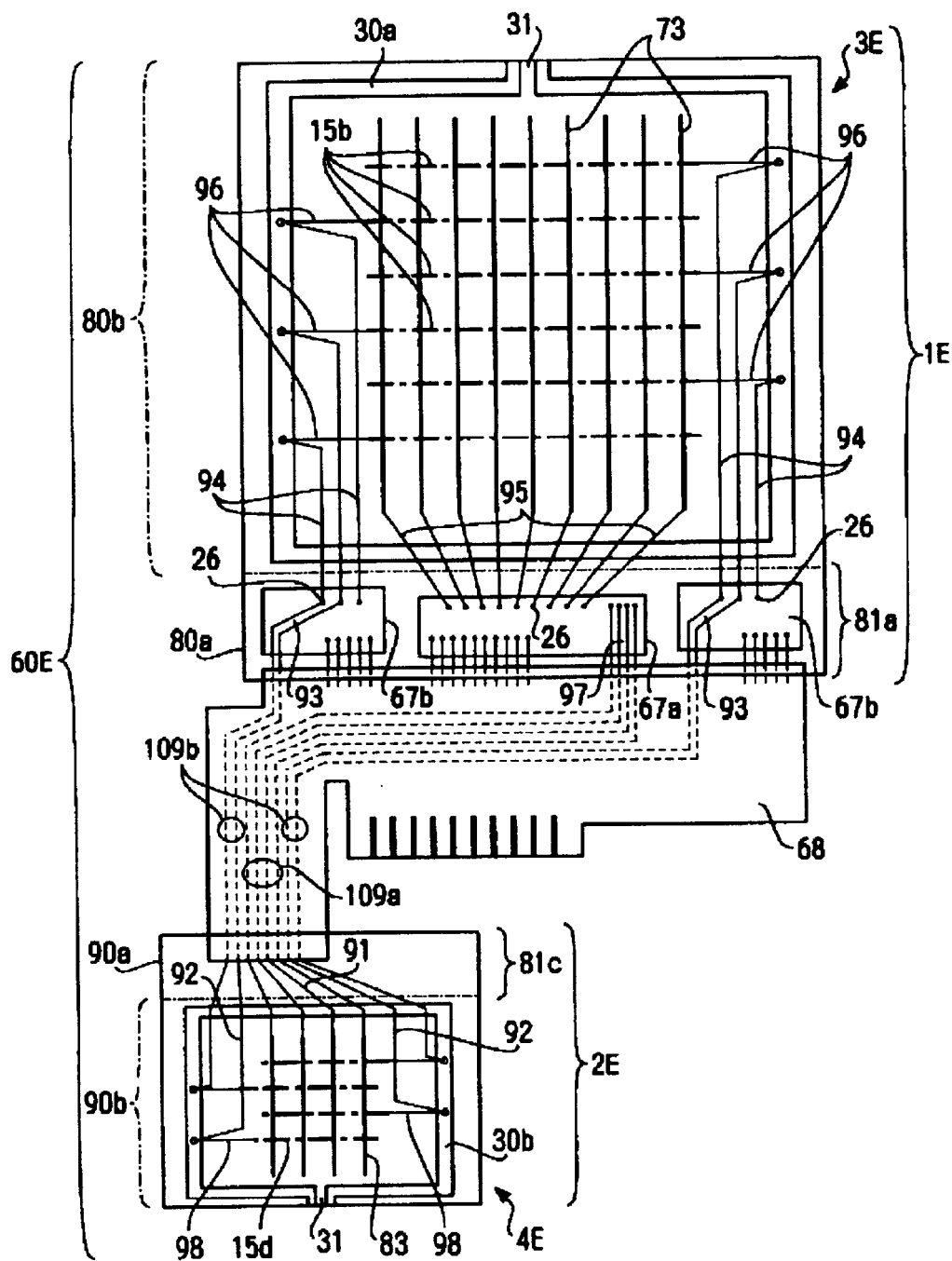
FIG. 11 is a plan sectional view showing still another embodiment of a case in which the present invention is applied to a liquid crystal panel, which is an example of an electro-optical panel, and to a liquid crystal device, which is an example of an electro-optical device.

FIG. 11 shows the plan configuration of yet another embodiment of an electro-optical panel and an electro-optical device according to the present invention. The electro-optical panel shown here is a liquid crystal panel, and the electro-optical device is a liquid crystal device. The liquid crystal panel is in an active matrix mode in which switching devices such as TFD devices are used. Also, the liquid crystal panel is in a transmissive mode in which an illuminator is used as a backlight unit. These modes are the same as those in the liquid crystal panel used in the liquid crystal device 60B according to the foregoing embodiment shown in FIG. 6 and in the liquid crystal device 60D according to the foregoing embodiment shown in FIG. 10.

In the electro-optical panel and the electro-optical device shown in FIG. 11, the same reference numerals are used to indicate the same components as those of the electro-optical panels and the electro-optical devices shown in FIGS. 6 and 11, and descriptions thereof are omitted.

In FIG. 11, the liquid crystal panel is formed by connecting a first panel 3E, which is a main panel structure forming a main display 1E, and a second panel 4E, which is a main panel structure forming a sub-display 2E, with each other using a second wiring board 68. A liquid crystal device 60E is formed by mounting polarizers, an illuminator, and other necessary additional elements on the liquid crystal panel. Also in this embodiment, similar to the case shown in FIG. 10, the second wiring board 68 performs a function of connecting the main display 1E to the sub-display 2E and a function of leading signals from an external circuit to the liquid crystal device 60E.

In the liquid crystal device 60E shown in FIG. 11, line wires 73 functioning as signal lines in the main display 1E are connected to output electrodes 26 of a data-line drive IC 67a via first wires 95. Second electrodes 15b functioning as scanning lines are connected to output electrodes 26 of scanning-line drive ICs 67b via second wires formed by routed wires 96 and routed wires 94.

Line wires 83 functioning as signal lines in the sub-display 2E are connected to the output electrodes 26 of the data-line drive IC 67a via fifth wires 91 formed on a first substrate 90a of the sub-display 2E, wires 109a formed on the second wiring board 68, and third wires 97 formed on a first substrate 80a of the main display 1E.

Fourth electrodes 15d functioning as scanning lines in the sub-display 2E are connected to the output electrodes 26 of the scanning-line drive ICs 67b via sixth wires formed by routed wires 98 formed on a second substrate 90b and routed wires 92 formed on the first substrate 90a, wires 109b formed on the second wiring board 68, and fourth wires 93 formed on the first substrate 80a of the main display 1E.

In this embodiment, the second electrodes 15b (i.e., scanning lines) of the main display 1E and the fourth electrodes 15d (i.e., scanning lines) of the sub-display 2E are connected to the same output electrodes 26 of the scanning-line drive ICs 67b. Thus, the scanning lines are shared.

In this embodiment, the second panel 4E in the sub-display 2E is connected to the first panel 3E in the main display 1E by the second wiring board 68 on the side (that is, the side corresponding to a first protrusion 81a) on which the drive circuits, namely, the drive ICs 67a and 67b, are mounted in the main display 1E. In other words, the display area of the main display 1E and the sub-display 2E are disposed on opposite sides with respect to the drive ICs 67a and 67b therebetween.

Another Embodiment of Electro-optical Panel and Electro-optical Device

Figure 12:
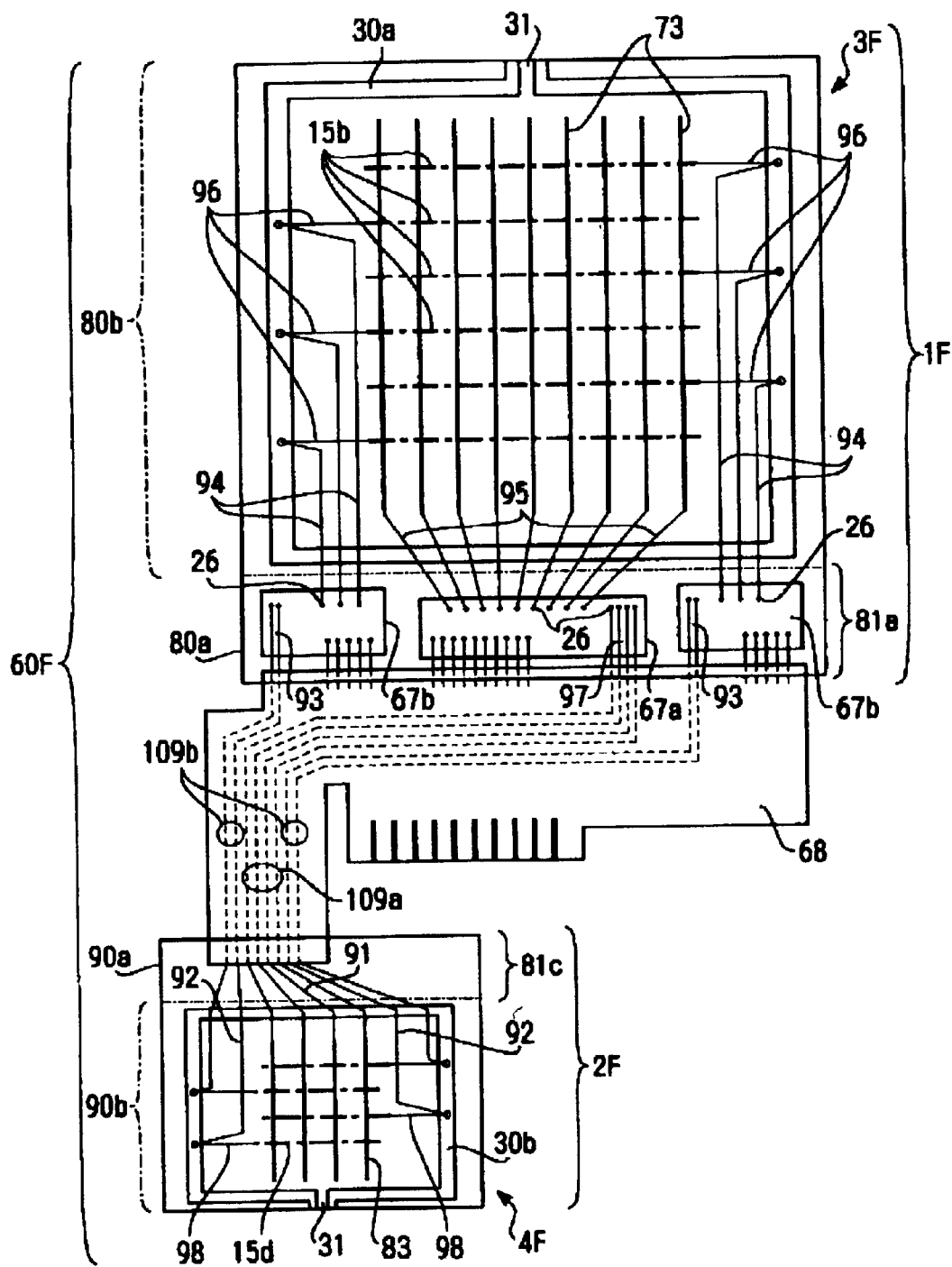
FIG. 12 is a plan sectional view showing another embodiment of a case in which the present invention is applied to a liquid crystal panel, which is an example of an electro-optical panel, and to a liquid crystal device, which is an example of an electro-optical device.

FIG. 12 shows the plan configuration of another embodiment of an electro-optical panel and an electro-optical device according to the present invention. The electro-optical panel shown here is a liquid crystal panel, and the electro-optical device is a liquid crystal device. The liquid crystal panel is in an active matrix mode in which switching devices such as TFD devices are used. Also, the liquid crystal panel is in a transmissive mode in which an illuminator is used as a backlight unit. These modes are the same as those in the liquid crystal panel used in the liquid crystal device 60B according to the foregoing embodiment shown in FIG. 6, in the liquid crystal device 60D according to the foregoing embodiment shown in FIG. 10, and in the liquid crystal device 60E according to the foregoing embodiment shown in FIG. 11.

In the electro-optical panel and the electro-optical device shown in FIG. 12, the same reference numerals are used to indicate the same components as those of the electro-optical panels and the electro-optical devices shown in FIGS. 6, 10, and 11, and descriptions thereof are omitted.

In FIG. 12, the liquid crystal panel is formed by connecting a first panel 3F, which is a main panel structure forming a main display 1F, and a second panel 4F, which is a main panel structure forming a sub-display 2F, with each other using a second wiring board 68. A liquid crystal device 60F is formed by mounting polarizers, an illuminator, and other necessary additional elements on the liquid crystal panel. Also, in this embodiment, similar to the case shown in FIG. 11, the second wiring board 68 performs a function of connecting the main display 1F to the sub-display 2F and a function of leading signals from an external circuit to the liquid crystal device 60F.

Also in the liquid crystal device 60F shown in FIG. 12, line wires 73 functioning as signal lines in the main display 1F are connected to output electrodes 26 of a data-line drive IC 67a via first wires 95. Second electrodes 15b functioning as scanning lines are connected to output electrodes 26 of scanning-line drive ICs 67b via second wires formed by routed wires 96 and routed wires 94.

Line wires 83 functioning as signal lines in the sub-display 2F are connected to the output electrodes 26 of the data-line drive IC 67a via fifth wires 91 formed on a first substrate 90a of the sub-display 2F, wires 109a formed on the second wiring board 68, and third wires 97 formed on a first substrate 80a of the main display 1F.

Fourth electrodes 15d functioning as scanning lines in the sub-display 2F are connected to the output electrodes 26 of the scanning-line drive ICs 67b via sixth wires formed by routed wires 98 formed on a second substrate 90b and routed wires 92 formed on the first substrate 90a, wires 109b formed on the second wiring board 68, and fourth wires 93 formed on the first substrate 80a of the main display 1F.

In this embodiment, the output electrodes 26 of the drive ICs 67a and 67b are not shared between the main display 1E and the sub-display 2F. Specifically, the line wires 73 of the main display 1F, the second electrodes 15b of the main display 1F, the line wires 83 of the sub-display 2F, and the fourth electrodes 15d of the sub-display 2F are connected to different portions of the output electrodes 26 of the drive ICs 67a and 67b, respectively. In other words, in this embodiment, neither signal line nor scanning line is shared.

In this embodiment, the second panel 4F in the sub-display 2F is connected to the first panel 3F in the main display 1F by the second wiring board 68 on the side (that is, the side corresponding to a first protrusion 81a) on which the drive circuits, namely, the drive ICs 67a and 67b, are mounted in the main display 1F. In other words, the display area of the main display 1F and the sub-display 2F are disposed on opposite sides with respect to the drive ICs 67a and 67b therebetween.

Another Embodiment of Electro-optical Panel and Electro-optical Device

Figure 13:
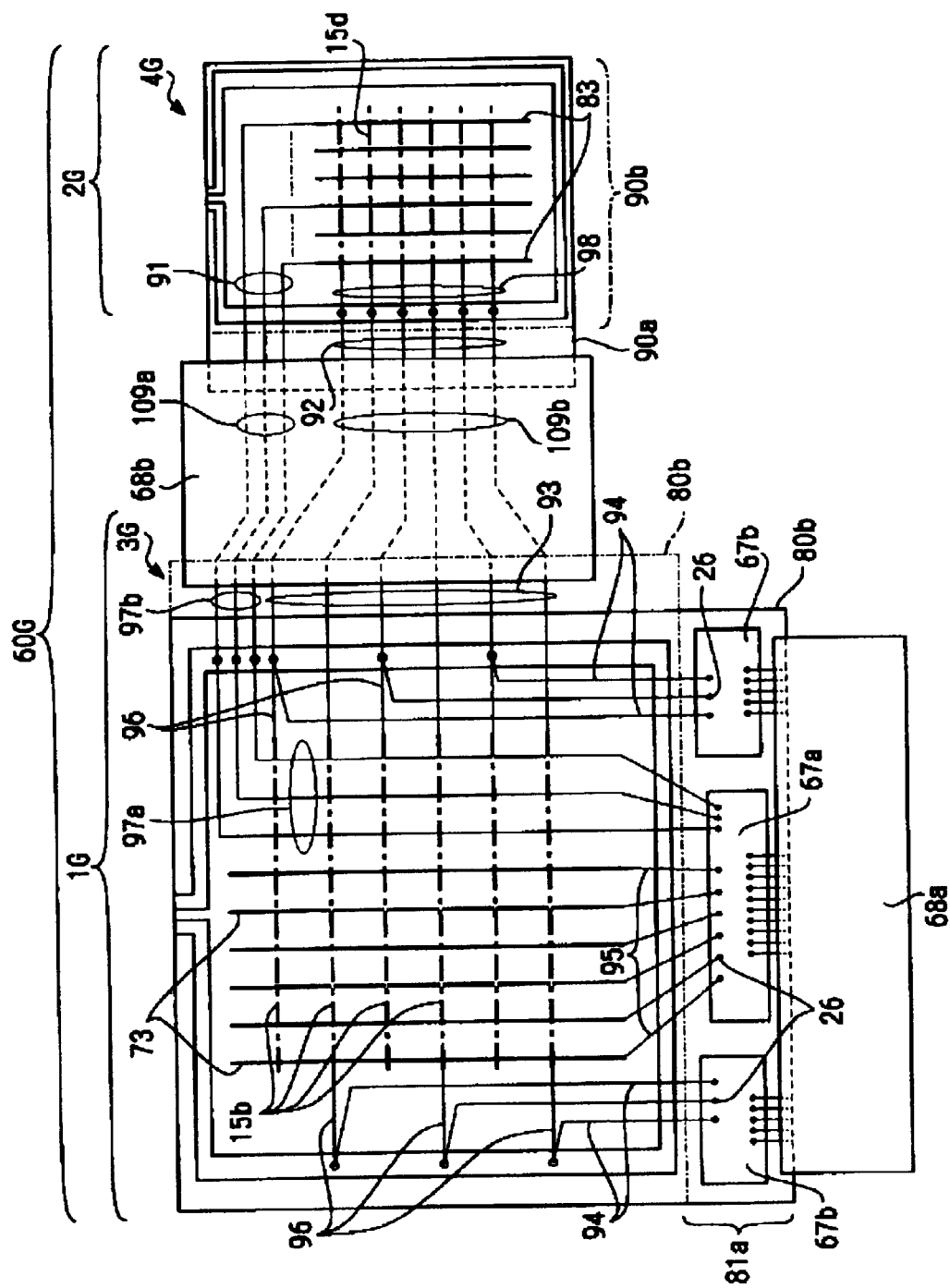
FIG. 13 is a plan sectional view showing still another embodiment of a case in which the present invention is applied to a liquid crystal panel, which is an example of an electro-optical panel, and to a liquid crystal device, which is an example of an electro-optical device.

FIG. 13 shows the plan configuration of another embodiment of an electro-optical panel and an electro-optical device according to the present invention. The electro-optical panel shown here is a liquid crystal panel, and the electro-optical device is a liquid crystal device. The liquid crystal panel is in an active matrix mode in which switching devices such as TFD devices are used. Also, the liquid crystal panel is in a transmissive mode in which an illuminator is used as a backlight unit. These modes are the same as those in the liquid crystal panel used in the liquid crystal device 60B according to the foregoing embodiment shown in FIG. 6.

In the electro-optical panel and the electro-optical device shown in FIG. 13, the same reference numerals are used to indicate the same components as those of the electro-optical panel and the electro-optical device shown in FIG. 6, and descriptions thereof are omitted.

In FIG. 13, the liquid crystal panel is formed by connecting a first panel 3G, which is a main panel structure forming a main display 1G, and a second panel 4G, which is a main panel structure forming a sub-display 2G, with each other using a second wiring board 68b. A liquid crystal device 60G is formed by mounting polarizers, an illuminator, and other necessary additional elements on the liquid crystal panel.

In this embodiment, similar to the liquid crystal device 60B shown in FIG. 6, a first wiring board 68a for leading signals from an external circuit to the liquid crystal device 60G is connected to the main display 1G. In other words, the second wiring board 68b for connecting the main display 1G to the sub-display 2G and the first wiring board 68a for leading signals from the external circuit to the liquid crystal device 60G are used separately.

Similar to the liquid crystal device 60B shown in FIG. 6, also in the liquid crystal device 60G shown in FIG. 13, line wires 73 functioning as signal lines in the main display 1G are connected to output electrodes 26 of a data-line drive IC 67a via first wires 95. Second electrodes 15b functioning as scanning lines are connected to output electrodes 26 of scanning-line drive ICs 67b via second wires formed by routed wires 96 on a second substrate 80b and routed wires 94 on a first substrate 80a.

Line wires 83 functioning as signal lines in the sub-display 2G are connected to the output electrodes 26 of the data-line drive IC 67a via fifth wires 91 formed on a first substrate 90a of the sub-display 2G, wires 109a formed on the second wiring board 68b, and third wires formed by routed wires 97b formed on the second substrate 80b and routed wires 97a formed on the first substrate 80a of the main display 1G Fourth electrodes 15d functioning as scanning lines in the sub-display 2G are connected to the output electrodes 26 of the scanning-line drive ICs 67b via sixth wires formed by routed wires 98 formed on a second substrate 90b and routed wires 92 formed on the first substrate 90a, wires 109b formed on the second wiring board 68b, and fourth wires 93 formed on the second substrate 80b of the main display 1G.

In this embodiment, the second electrodes 15b (i.e., scanning lines) of the main display 1G and the fourth electrodes 15d (i.e., scanning lines) of the sub-display 2G are connected to the same output electrodes 26 of the scanning-line drive ICs 67b. Thus, the scanning lines are shared.

In the liquid crystal device 60B shown in FIG. 6, the second panel 4B in the sub-display 2B is connected to the first panel 3B in the main display 1B by the second wiring board 78b on the side (that is, the side corresponding to the second protrusion 81b) opposing the side (that is, the side corresponding to the first protrusion 81a) on which the drive circuits, namely, the drive ICs 67a and 67b, are mounted in the main display 1B.

In contrast, in this embodiment shown in FIG. 13, the second panel 4G in the sub-display 2G is connected to the first panel 3G in the main display 1G by the second wiring board 68b on the side adjacent to the side (that is, the side corresponding to a first protrusion 81a)) on which the drive circuits, namely, the drive ICs 67a and 67b, are mounted in the main display 1G.

In other words, in the case of the embodiment shown in FIG. 6, the display area of the main display 1B and the sub-display 2B are disposed on the same side with respect to the drive ICs 67a and 67b. In contrast, in this embodiment shown in FIG. 13, the display area of the main display 1G and the sub-display 2G are disposed next to each other in a direction parallel to the direction in which the drive ICs 67a and 67b are aligned.

In the embodiment shown in FIG. 13, the scanning lines are shared between the main display 1G and the sub-display 2G. Alternatively, the signal lines can be shared. This can be achieved by electrically connecting, by wires, edges of the line wires 73 of the main display 1G side to edges of the line wires 83 side of the sub-display 2G.

Other Embodiments

While a number of preferred embodiments have been used to describe the present invention, the present invention is not limited to these embodiments. Various modifications may be made in the present invention without departing from the scope of the present invention described in the claims.

For example, although the TN-type or STN-type liquid crystal is used as the liquid crystal in the foregoing embodiments, a bistable type having memory effects such as a BTN (Bistable Twisted Nematic) type or a ferroelectric type, a macromolecular dispersed type, or a GH (guest-host) type can be used instead.

In the GH type liquid crystal, a dye (i.e., guest) which exhibits anisotropy in visible light absorption between the long axis direction and the short axis direction of the molecules is dissolved in liquid crystal (i.e., host) whose molecules are aligned in a certain direction, the dye molecules being oriented parallel to the liquid crystal molecules.

Alternatively, the configuration can have a vertical alignment (i.e., homeotropic alignment). In the homeotropic alignment, with no voltage applied, the liquid crystal molecules are oriented perpendicular to both substrates, and, when a voltage is applied, the liquid crystal molecules are oriented parallel to both substrates. Also, the configuration can have a horizontal alignment (i.e., homogeneous alignment). In the homogeneous alignment, with no voltage applied, the liquid crystal molecules are oriented parallel to both substrates, and, when a voltage is applied, the liquid crystal molecules are oriented perpendicular to both substrates.

Accordingly, the present invention is applicable to various liquid crystal devices using different types of liquid crystal and alignment modes.

Although the liquid crystal device is illustrated as the electro-optical device in the foregoing embodiments, as electro-optical devices to which the present invention is applicable, for example, an organic electro-luminescence device, an inorganic electro-luminescence device, a plasma display, an electrophoretic display (EPD), and a field emission display (FED) are conceivable.

Although the cellular phone is illustrated as the electronic apparatus in the foregoing embodiments, as electronic apparatuses to which the present invention is applicable, for example, a personal computer, a digital still camera, a wristwatch electronic apparatus, a PDA (Personal Digital Assistant), a television, a viewfinder-type video cassette recorder, a monitor-direct-viewing-type video cassette recorder, a car navigation system, a pager, an electronic notebook, an electronic calculator, a word processor, a workstation, a video phone, and a POS terminal are conceivable.

The entire disclosure of Japanese Patent Application Nos. 2001-289008 filed Sep. 21, 2001 and 2002-231538 filed Aug. 8, 2002 are incorporated by reference herein.

What is claimed is:

1. An electro-optical panel comprising:
    a first panel having a panel edge and a driver edge on opposite sides thereof;
    first line wires traversing the first panel in a direction non-parallel to the panel edge and the driver edge of the first panel;
    a first wire group consisting of consecutive ones of said first line wires such that said first wire group is free from wires being positioned between said first line wires;
    a second panel having an edge that is coupled to the panel edge of the first panel;
    second line wires traversing the second panel in a direction non-parallel to the edge of the second panel, the second line wires being continuous with and electrically connected to the first wire group and consisting of a smaller number of line wires than the first line wires; and
    a drive circuit driving the first panel and the second panel, the drive circuit being mounted on the driver edge of the first panel.

2. An electro-optical panel according to claim 1, wherein the drive circuit is mounted on the first panel.

3. An electro-optical panel according to claim 1, wherein:
    the first panel comprises a first substrate including a first electrode to which a signal is supplied from the drive circuit and a second substrate including a second electrode to which a signal is supplied from the drive circuit,
    the second panel comprises a third substrate including a third electrode to which a signal is supplied from the drive circuit and a fourth substrate including a fourth electrode to which a signal is supplied from the drive circuit, and
    the first electrode and the third electrode are electrically connected to each other.

4. An electro-optical panel according to claim 3, wherein liquid crystal is held between the first substrate and the second substrate and between the third substrate and the fourth substrate.

5. An electro-optical panel according to claim 3, wherein the signal supplied from the drive circuit to the third electrode is supplied via the first electrode.

6. An electro-optical panel according to claim 3, wherein the first electrode and the third electrode are electrically connected to each other via a flexible wiring board.

7. An electro-optical panel according to claim 3, wherein the first electrode and the third electrode are substantially linear, and the first electrode and the third electrode are disposed substantially parallel to each other.

8. An electro-optical panel according to claim 3, wherein the first panel includes:
    a first wire electrically connecting the drive circuit to the first electrode;
    a second wire electrically connecting the drive circuit to the second electrode;
    a third wire electrically connecting the first electrode to the third electrode; and
    a fourth wire electrically connecting the drive circuit to the fourth electrode.

9. An electro-optical panel according to claim 8, wherein the first wire, the second wire, the third wire, and the fourth wire are disposed on the first substrate.

10. An electro-optical panel according to claim 3, wherein the drive circuit is adapted to:
    stop signal supply to the fourth electrode when the first panel is displaying; and
    stop signal supply to the second electrode when the second panel is displaying.

11. An electro-optical device comprising an electro-optical panel as set forth in claim 1.

12. An electro-optical device according to claim 11, further comprising a plurality of faces, wherein the first panel and the second panel are disposed on different faces among the plurality of faces.

13. An electronic apparatus comprising an electro-optical device as set forth in claim 11.

14. An electro-optical panel according to claim 2, wherein the drive circuit is mounted on one side of the first panel, and
    the second panel is connected to the first panel on a side facing the one side.

15. An electro-optical panel according to claim 2, wherein the drive circuit is mounted on one side of the first panel, and
    the second panel is connected to the first panel on a side adjacent to the one side.

16. An electro-optical panel according to claim 2, wherein the drive circuit is mounted on one side of the first panel, and
    the second panel is connected to the first panel on the one side.

17. An electro-optical panel according to claim 3, wherein the first electrode and the third electrode further comprise signal lines.

18. An electro-optical panel according to claim 1, wherein:
    the first panel comprises a first substrate including a first electrode to which a signal is supplied from the drive circuit and a second substrate including a second electrode to which a signal is supplied from the drive circuit,
    the second panel comprises a third substrate including a third electrode to which a signal is supplied from the drive circuit and a fourth substrate including a fourth electrode to which a signal is supplied from the drive circuit,
    the second electrode and the fourth electrode are electrically connected to each other, and
    the second electrode and the fourth electrode are scanning lines.

19. An electro-optical panel according to claim 3, wherein the second electrode and the fourth electrode are electrically connected to each other.

20. An electro-optical panel according to claim 1, wherein:

the first panel comprises a first substrate including a first electrode to which a signal is supplied from the drive circuit and a second substrate including a second electrode to which a signal is supplied from the drive circuit, the second panel comprises a third substrate including a third electrode to which a signal is supplied from the drive circuit and a fourth substrate including a fourth electrode to which a signal is supplied from the drive circuit, and each of the first electrode, the second electrode, the third electrode, and the fourth electrode is independently and electrically connected to the drive circuit.

21. The electrooptical panel according to claim 1, wherein the first line wires include a central group of first line wires centrally located with respect to the panel edge, corresponding ones of the second line wires being continuous with and electrically connected to the central group of first line wires.

22. The electrooptical panel according to claim 1, wherein the edge of the second panel is shorter than the panel edge of the first panel, so that the second panel has a narrower width than the first panel.

23. An electrooptical panel comprising:

a first panel having a driver edge;

first line wires traversing the first panel;

a drive circuit mounted on the driver edge of the first panel and electrically connected to the first line wires to apply signals to the first line wires;

a second panel having an edge that is coupled to the driver edge of the first panel; and second line wires traversing the second panel, the second line wires consisting of a smaller number of line wires than the first line wires and being electrically connected to the drive circuit to receive signals from the drive circuit.

24. The electrooptical panel as claimed in claim 23, wherein the first line wires are continuous with and electrically connected to the second line wires.

* * * * *